(12) United States Patent
Handa et al.

(10) Patent No.: US 11,694,389 B2
(45) Date of Patent: Jul. 4, 2023

(54) AVATAR OUTPUT DEVICE, TERMINAL DEVICE, AVATAR OUTPUT METHOD, AND PROGRAM

(71) Applicant: Cluster, Inc, Tokyo (JP)

(72) Inventors: Daiki Handa, Tokyo (JP); Hiroki Kurimoto, Tokyo (JP)

(73) Assignee: CLUSTER, INC, Tokyo (JP)

( * ) Notice: Subject to any disclaimer, the term of this patent is extended or adjusted under 35 U.S.C. 154(b) by 0 days.

(21) Appl. No.: 17/833,916

(22) Filed: Jun. 7, 2022

(65) Prior Publication Data

US 2022/0398801 A1 Dec. 15, 2022

(30) Foreign Application Priority Data

Jun. 9, 2021 (JP) .................................. 2021-096279

(51) Int. Cl.
  *G06T 15/10* (2011.01)
  *G06T 17/20* (2006.01)

(52) U.S. Cl.
  CPC .............. *G06T 15/10* (2013.01); *G06T 17/20* (2013.01)

(58) Field of Classification Search
  None
  See application file for complete search history.

(56) References Cited

U.S. PATENT DOCUMENTS

| | | | |
|---|---|---|---|
| 6,329,986 B1 * | 12/2001 | Cheng ..................... | G06F 3/011 715/706 |
| 8,471,849 B1 * | 6/2013 | Hickman ................ | G06F 3/013 345/428 |
| 2010/0275136 A1 | 10/2010 | Gower | |
| 2013/0013089 A1 * | 1/2013 | Kawakami ......... | H04N 21/8153 700/90 |
| 2019/0308109 A1 * | 10/2019 | Sullivan .................. | A63F 13/87 |

(Continued)

FOREIGN PATENT DOCUMENTS

| | | |
|---|---|---|
| JP | 2000-123195 A | 4/2000 |
| JP | 2000-231644 A | 8/2000 |

(Continued)

OTHER PUBLICATIONS

JP 2018028789 A, Naoto et al, English translation by Google, Feb. 22, 2018.*

(Continued)

*Primary Examiner* — Sultana M Zalalee
(74) *Attorney, Agent, or Firm* — Xsensus LLP

(57) ABSTRACT

An avatar output device includes an avatar storage unit that stores, for each of two or more avatars, avatar information including first model information for displaying the avatar; a determination unit that determines at least one first avatar displayed using the first model information and at least one second avatar displayed using second model information with a data size smaller than a data size of the first model information from among the two or more avatars; an avatar acquisition unit that acquires an avatar using the second model information for each of the at least one second avatar determined by the determination unit, and acquires an avatar using the first model information for each of the at least one first avatar; and an avatar output unit that outputs the two or more avatars acquired by the avatar acquisition unit.

13 Claims, 14 Drawing Sheets

(56) References Cited

U.S. PATENT DOCUMENTS

| | | | | |
|---|---|---|---|---|
| 2019/0362131 A1* | 11/2019 | Gotoh | .................... | G06V 20/64 |
| 2020/0134898 A1* | 4/2020 | Sheth | ..................... | G06T 17/20 |
| 2021/0142516 A1* | 5/2021 | Ma | ........................ | G06T 19/006 |
| 2021/0295578 A1* | 9/2021 | Lee | ....................... | G06T 13/205 |
| 2022/0095008 A1* | 3/2022 | Otsuka | ................ | H04N 21/472 |
| 2023/0018262 A1* | 1/2023 | Watanabe | ............... | A63F 13/52 |

FOREIGN PATENT DOCUMENTS

| | | | |
|---|---|---|---|
| JP | 2004-178036 | A | 6/2004 |
| JP | 2007-259953 | A | 10/2007 |
| JP | 2008-107895 | A | 5/2008 |
| JP | 2010-86163 | A | 4/2010 |
| JP | 2012-525622 | A | 10/2012 |
| JP | 2018-28789 | A | 2/2018 |
| JP | 2018-116537 | A | 7/2018 |
| JP | 2020-102782 | A | 7/2020 |
| JP | 2020-107264 | A | 7/2020 |
| WO | 2020/090786 | A1 | 5/2020 |
| WO | 2020/194821 | A1 | 10/2020 |

OTHER PUBLICATIONS

Office Action dated Apr. 12, 2022, in corresponding Japanese patent Application No. 2021-181573, 28 pages.

Office Action dated Jun. 21, 2022, in corresponding Japanese patent Application No. 2021-181573, 24 pages.

Minoura et al., "A Method to Display a Large Number of Participants in Multi-User 3D Cyberspace", The Institute of Electronics, Information and communication Engineers, May 25, 1998, vol. J81-D-II, No. 5, pp. 962-971, total 11 pages (see translation of Office Action dated Apr. 12, 2022).

Notice of Reasons for Refusal dated Sep. 7, 2021, received for JP Application 2021-096279, 20 pages including English Translation.

Notice of Reasons for Refusal dated Oct. 19, 2021, received for JP Application 2021-096279, 6 pages including English Translation.

Decision to Grant dated Nov. 24, 2021, received for JP Application 2021-096279, 6 pages including English Translation.

* cited by examiner

FIG. 10

| ID | AVATAR IDENTIFIER | FIRST MODEL INFORMATION | SECOND MODEL INFORMATION | ATTRIBUTE VALUE |||| TERMINAL ATTRIBUTE VALUE ||
|---|---|---|---|---|---|---|---|---|---|
| | | | | POSITION INFORMATION | ROLE ATTRIBUTE VALUE | ORIGIN ATTRIBUTE VALUE | | SCREEN SIZE | OPERATING FREQUENCY |
| 1 | A001 | $M_{11}$.json | $M_{12}$.json | $(x_1, y_1, z_1)$ | AUDIENCE | UGC | | $V_1 \times H_1$ | 5 |
| 2 | A002 | $D_1$.json | $D_2$.json | $(x_2, y_2, z_2)$ | AUDIENCE | DEFAULT | | $V_2 \times H_2$ | 1 |
| 3 | A003 | $M_{31}$.json | $M_{32}$.json | $(x_3, y_3, z_3)$ | ORGANIZER | UGC | | $V_3 \times H_3$ | 3 |
| 4 | A004 | $M_{41}$.json | $M_{42}$.json | $(x_4, y_4, z_4)$ | MC | UGC | | $V_4 \times H_4$ | 3 |
| ... | ... | ... | ... | ... | ... | ... | | ... | ... |
| N | AN | $M_{n1}$.json | $M_{n2}$.json | $(x_n, y_n, z_n)$ | AUDIENCE | UGC | | $V_n \times H_n$ | 5 |

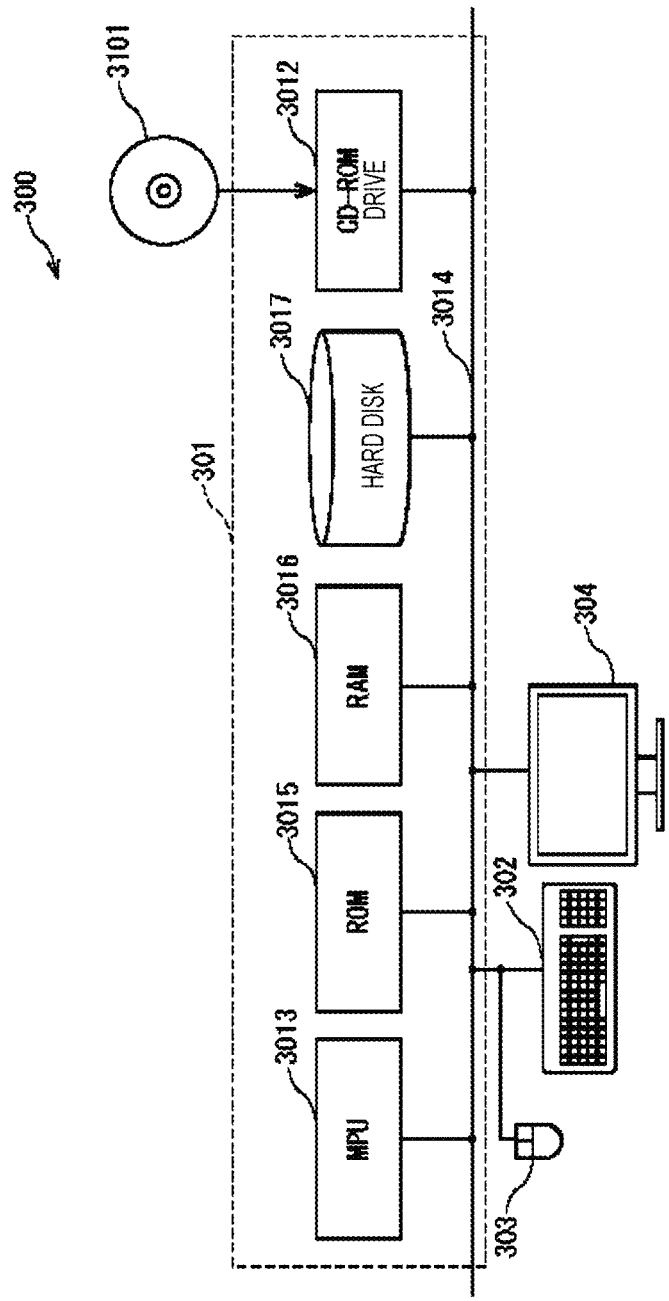

AVATAR OUTPUT DEVICE, TERMINAL DEVICE, AVATAR OUTPUT METHOD, AND PROGRAM

CROSS-REFERENCE TO RELATED APPLICATION

This application claims priority from Japanese Application No. 2021-096279, filed on Jun. 9, 2021, the contents of which are incorporated by reference herein in its entirety.

1. TECHNICAL FIELD

The present disclosure relates to an avatar output device that performs processing related to output of an avatar, and the like.

2. BACKGROUND

Conventionally, there has been a content distribution system that achieves providing a preferable viewing experience while ensuring a realistic feeling in which many people participate (see JP 6688378 B1). In such a system, when the content of a main character and the content of a sub character indicating a viewing user are output, a ratio of the sub characters which are allowed to have a predetermined behavior among the sub characters is determined, and only the sub characters in the determined ratio are moved.

Typically, in a case where many avatars are output, it is unfortunately difficult to obtain an avatar suitable for a user while suppressing a processing load. Note that the avatar is a character displayed as a representation of the user.

SUMMARY

An avatar output device according to a first aspect of the present disclosure includes: an avatar storage unit that stores, for each of two or more avatars, avatar information including first model information for displaying the avatar; a determination unit that determines at least one first avatar displayed using the first model information and at least one second avatar displayed using second model information with a data size smaller than a data size of the first model information from among the two or more avatars; an avatar acquisition unit that acquires an avatar using the second model information for each of the at least one second avatar determined by the determination unit, and acquires an avatar using the first model information for each of the at least one first avatar; and an avatar output unit that outputs the two or more avatars acquired by the avatar acquisition unit.

According to this configuration, at least some of the two or more avatars are set to have a smaller data size, and thus, it is possible to obtain an avatar suitable for the user while suppressing the processing load when many avatars are output.

According to a second aspect of the present disclosure, in the avatar output device according to the first aspect, the avatar information also includes first voice information for allowing the avatar to output a voice, the determination unit determines at least one first avatar corresponding to the first voice information and at least one second avatar corresponding to second voice information which has a data size smaller than a data size of the first voice information or second voice information having an attribute value different from that of the first voice information, from among the two or more avatars, and the avatar output device further includes a voice acquisition unit that acquires the second voice information for each of the at least one second avatar determined by the determination unit and acquires the first voice information for each of the at least one first avatar, and a voice output unit that outputs the first voice information and the second voice information acquired by the voice acquisition unit.

According to this configuration, the voice information corresponding to the avatar is used, whereby appropriate voices of two or more avatars can be output.

According to a third aspect of the present disclosure, the avatar output device according to the first or second aspect further includes: an avatar reception unit that receives the first model information or original information that is an original of the first model information from each of two or more terminal devices used by a user; and an avatar accumulation unit that accumulates the avatar information including the first model information received by the avatar reception unit or the first model information acquired using the original information received by the avatar reception unit in the avatar storage unit.

With this configuration, the model information or the original information of the avatar can be received and used from each of two or more terminal devices. That is, the user can display his or her favorite avatar in a field. Note that the field is a background on which the avatar is displayed or a periphery around which the avatar is displayed. The field is generally a virtual three-dimensional space. Note that the field may be referred to as a world.

According to a fourth aspect of the present disclosure, in the avatar output device according to the third aspect, the avatar reception unit also receives position information that specifies a position of the avatar corresponding to each of the two or more terminal devices from each of the two or more terminal devices, and the avatar output device further includes a position information transmitting unit that transmits, in association with an avatar identifier for identifying the avatar, position information of at least one other avatar from among position information of the two or more avatars corresponding to the two or more terminal devices except for at least the position information of a host avatar corresponding to the terminal device that is a transmission source, to each of the two or more terminal devices.

With this configuration, the position information of the other avatar can be transmitted to each of the two or more terminal devices.

According to a fifth aspect of the present disclosure, in the avatar output device according to the fourth aspect, the avatar reception unit receives, from each of the two or more terminal devices, a score of at least one other avatar acquired in each of the terminal devices or a determination result based on the score in association with the avatar identifier, and the determination unit determines, for each of the two or more terminal devices, at least one first avatar displayed using the first model information and at least one second avatar displayed using the second model information with a data size smaller than the data size of the first model information from among the two or more avatars, using the score or the determination result.

With this configuration, the scores of the other avatars are acquired by each of two or more terminal devices, whereby the load on the avatar output device can be reduced.

According to a sixth aspect of the present disclosure, the avatar output device according to any one of the third to fifth aspects further includes a model compression unit that acquires the second model information having a smaller data size than that the first model information using the first model information or the original information, wherein the avatar accumulation unit accumulates the avatar information including the first model information and the second model information in the avatar storage unit.

With this configuration, the second model information obtained by compressing the first model information of each of the two or more avatars can be obtained.

According to a seventh aspect of the present disclosure, in the avatar output device according to any one of the first to sixth aspects, the determination unit determines the at least one second avatar based on a score or a determination result acquired using at least one dynamic attribute value corresponding to each of the two or more avatars.

With this configuration, an avatar that is to be set to have a smaller data size can be determined based on an appropriate score acquired using the dynamic attribute value of the avatar.

According to an eighth aspect of the present disclosure, in the avatar output device according to the fourth or seventh aspect, at least one dynamic attribute value includes any one of an attribute value relating to a visual field of the user corresponding to the avatar, an attribute value relating to a field of view of a camera, an attribute value relating to a distance from the user, and an attribute value relating to an orientation of the user.

With this configuration, an avatar that is to be set to have a smaller data size can be determined based on the appropriate score acquired using the appropriate dynamic attribute value of the avatar.

According to a ninth aspect of the present disclosure, in the avatar output device according to any one of the first to eighth aspects, the second model information is model information in which information of only a part of the avatar has a reduced data size.

With this configuration, an avatar only partly having a small size can be used.

According to a tenth aspect of the present disclosure, the avatar output device according to any one of the first to ninth aspects shares processing until an image including two or more avatars is output in a terminal device with the terminal device.

With this configuration, the processing can be shared by the two or more terminal devices and the avatar output device.

According to an eleventh aspect of the present disclosure, in the avatar output device according to the tenth aspect, the determination unit determines at least one second avatar based on the score or the determination result acquired using at least one dynamic attribute value corresponding to each of the two or more avatars for each of the two or more terminal devices, the terminal device performs processing for acquiring the score or the determination result using the at least one dynamic attribute value, and the avatar output device performs processing for acquiring the second model information using the first model information.

With this configuration, the processing can be appropriately shared by the two or more terminal devices and the avatar output device.

According to a twelfth aspect of the present disclosure, in the avatar output device according to any one of the first to eleventh aspects, the avatar information of each of the two or more avatars in the avatar storage unit includes the first model information and the second model information, and the avatar acquisition unit: reads the second model information and constructs the avatar using the second model information for the at least one second avatar determined by the determination unit; and reads the first model information and constructs the avatar using the first model information for the at least one first avatar.

With this configuration, at least some of the two or more avatars are set to have a smaller data size, and thus, it is possible to obtain an avatar suitable for the user while suppressing the processing load when many avatars are output.

According to a thirteenth aspect of the present disclosure, in the avatar output device according to any one of the first to twelfth aspects, the avatar information of each of the two or more avatars in the avatar storage unit includes at least one static attribute value that does not dynamically change, and the determination unit determines the at least one second avatar using information based on the at least one static attribute value corresponding to each of the two or more avatars.

With this configuration, an avatar that is to be set to have a smaller data size can be determined based on the static attribute value of the avatar.

According to a fourteenth aspect of the present disclosure, in the avatar output device according to the thirteenth aspect, the at least one static attribute value includes either an attribute value relating to a role of the avatar or an attribute value relating to an origin of the avatar.

With this configuration, an avatar that is to be set to have a smaller data size can be determined based on an appropriate static attribute value of the avatar.

According to a fifteenth aspect of the present disclosure, in the avatar output device according to the thirteenth aspect, the at least one static attribute value includes an attribute value of the terminal device corresponding to the avatar.

With this configuration, an avatar that is to be set to have a smaller data size can be determined based on an appropriate static attribute value of the avatar.

According to a sixteenth aspect of the present disclosure, in the avatar output device according to any one of the first to fifteenth aspects, the second model information is model information having M (M is a natural number of 1 or more) mesh information acquired using N (N is a natural number of 2 or more) mesh information included in the first model information, M being less than N.

With this configuration, at least some of the two or more avatars can be set to have data which has been appropriately compressed, whereby an output including many avatars can be obtained in real time.

A terminal device according to a seventeenth aspect of the present disclosure is a terminal device that communicates with the avatar output device according to any one of the first to sixteenth aspects and displays an avatar, the terminal device including: a terminal storage unit that stores at least one terminal attribute value including position information of the avatar corresponding to the terminal device; a terminal transmission unit that transmits the position information to the avatar output device; a terminal reception unit that receives, from the avatar output device, position information of another avatar corresponding to at least one other terminal device; and a terminal processing unit that acquires a score of the at least one other avatar using the position information of the at least one other avatar and the position information, wherein the terminal transmission unit transmits the score of the at least one other avatar or a determination result based on the score to the avatar output device in association with a terminal identifier of the terminal device, the terminal reception unit receives, in response to the transmission of the score or the determination result, different pieces of model information of the other avatar corresponding to the score or the determination result from the avatar output device, and the terminal device further includes a terminal output unit that displays the at least one other avatar using the model information.

With this configuration, at least some of the avatars corresponding to each of two or more terminal devices are set to have a smaller data size, and thus, it is possible to obtain different outputs depending on two or more terminal devices 2 and to obtain an avatar suitable for the user while suppressing the processing load when many avatars are output.

The avatar output device according to the present disclosure can obtain an avatar suitable for a user while suppressing a processing load, when outputting a large number of avatars.

BRIEF DESCRIPTION OF THE DRAWINGS

FIG. 10 is a diagram illustrating an avatar management table according to one or more aspects of the disclosed subject matter;

FIG. 14 is a block diagram of the computer system.

DETAILED DESCRIPTION

Figure 1:
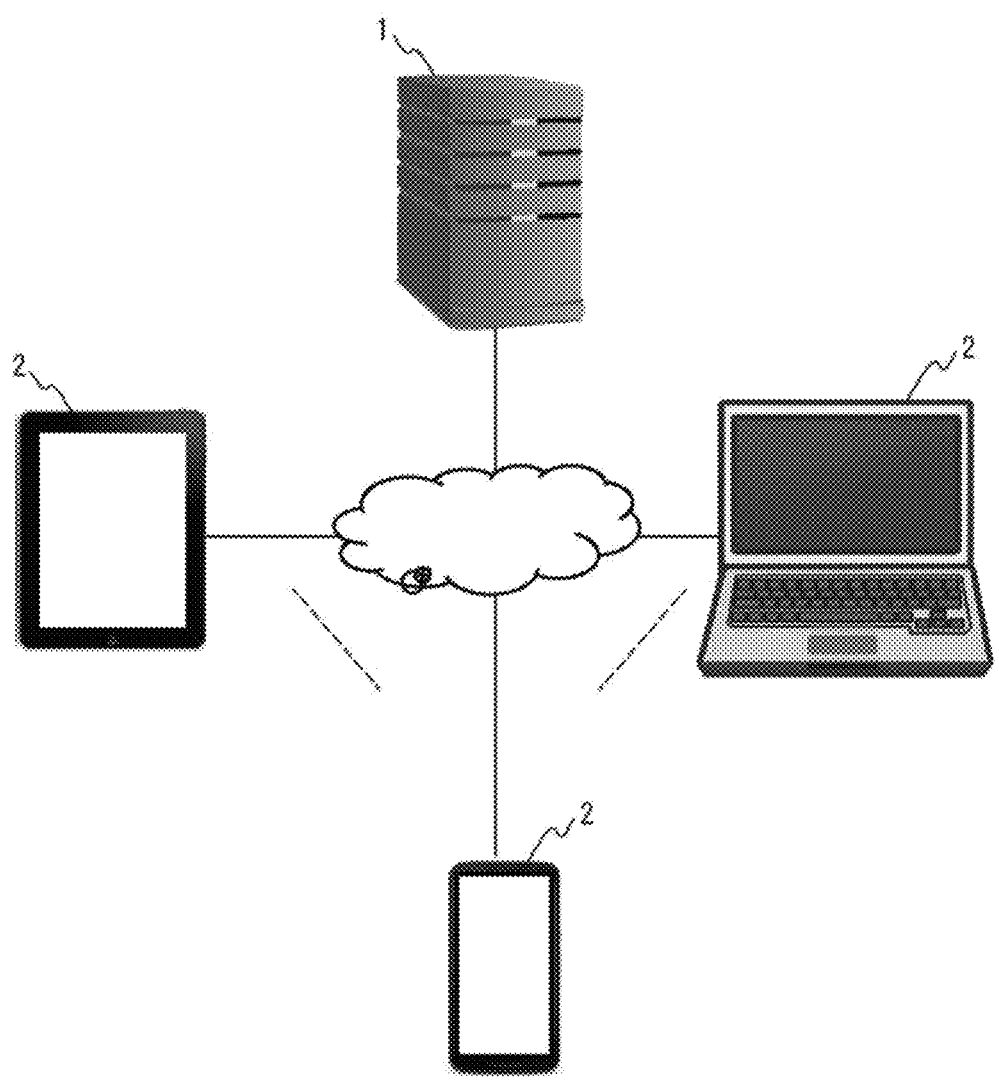
FIG. 1 is an exemplary diagram of an information system according to one or more aspects of the disclosed subject matter.

An embodiment of an avatar output device and the like will now be described with reference to the drawings. Note that, in the embodiment, components denoted by the same reference numerals similarly operate, and therefore, the redundant description thereof may be omitted.

The present disclosure will describe an information system that outputs at least some avatars among avatars of two or more users staying in a virtual three-dimensional space (hereinafter simply referred to as a "three-dimensional space" as appropriate) using small-size information. Note that, although the three-dimensional space is virtual reality (VR), it may be augmented reality (AR) or the like, for example.

The information system according to the present disclosure is, for example, a system for supporting communication between users in the three-dimensional space in which two or more avatars that represent the respective users gather. The information system is also applicable to games and the like. The information system has a function of outputting an avatar, and the application range thereof is not limited.

Note that, in the following, an avatar corresponding to one user among two or more users is expressed as a host avatar, and the avatars corresponding to other users are expressed as other avatars.

The present disclosure will also describe an information system that determines, using a score of each of two or more avatars, model information or voice information to be used for the avatar for each terminal device, and expresses the avatar using the determined model information or the voice information. Note that the score is obtained using a dynamic attribute value or a static attribute value.

In addition, the present disclosure will describe an information system that allows the avatar output device and the terminal device to share, as appropriate, the processing regarding display of avatars in the three-dimensional space.

FIG. 1 is a conceptual diagram of an information system A according to the present disclosure. The information system A includes an avatar output device 1 and one or more terminal devices 2.

The avatar output device 1 is a device that performs processing for outputting an avatar. Here, the avatar output device 1 is typically a so-called server, but may be a device that operates in a stand-alone mode. The avatar output device 1 is, for example, a cloud server, an Active Server Pages (ASP) server, or the like. Note that the type of the avatar output device 1 is not particularly limited. In a case where the avatar output device 1 is a stand-alone device, the terminal device 2 is unnecessary, and the avatar output device 1 executes some of the functions of the terminal device 2 described later.

The terminal device 2 is a terminal used by a user. The terminal device 2 is a terminal that outputs a host avatar corresponding to the terminal device 2 and one or more other avatars. One avatar corresponds to, for example, one terminal device 2. In addition, one avatar corresponds to, for example, one user. The other avatar is an avatar corresponding to another user who uses the other terminal device 2. Note that two or more avatars may correspond to one user. That is, one user may use one of two or more avatars by switching the two or more avatars. The terminal device 2 is, for example, a so-called personal computer, a tablet terminal, a smartphone, or the like, and the type thereof is not limited. Note that the output normally means displaying, but may be transmission to a display device.

Note that the avatar is generally a character output as a representation of the user. The avatar may be referred to as a character.

Figure 2:
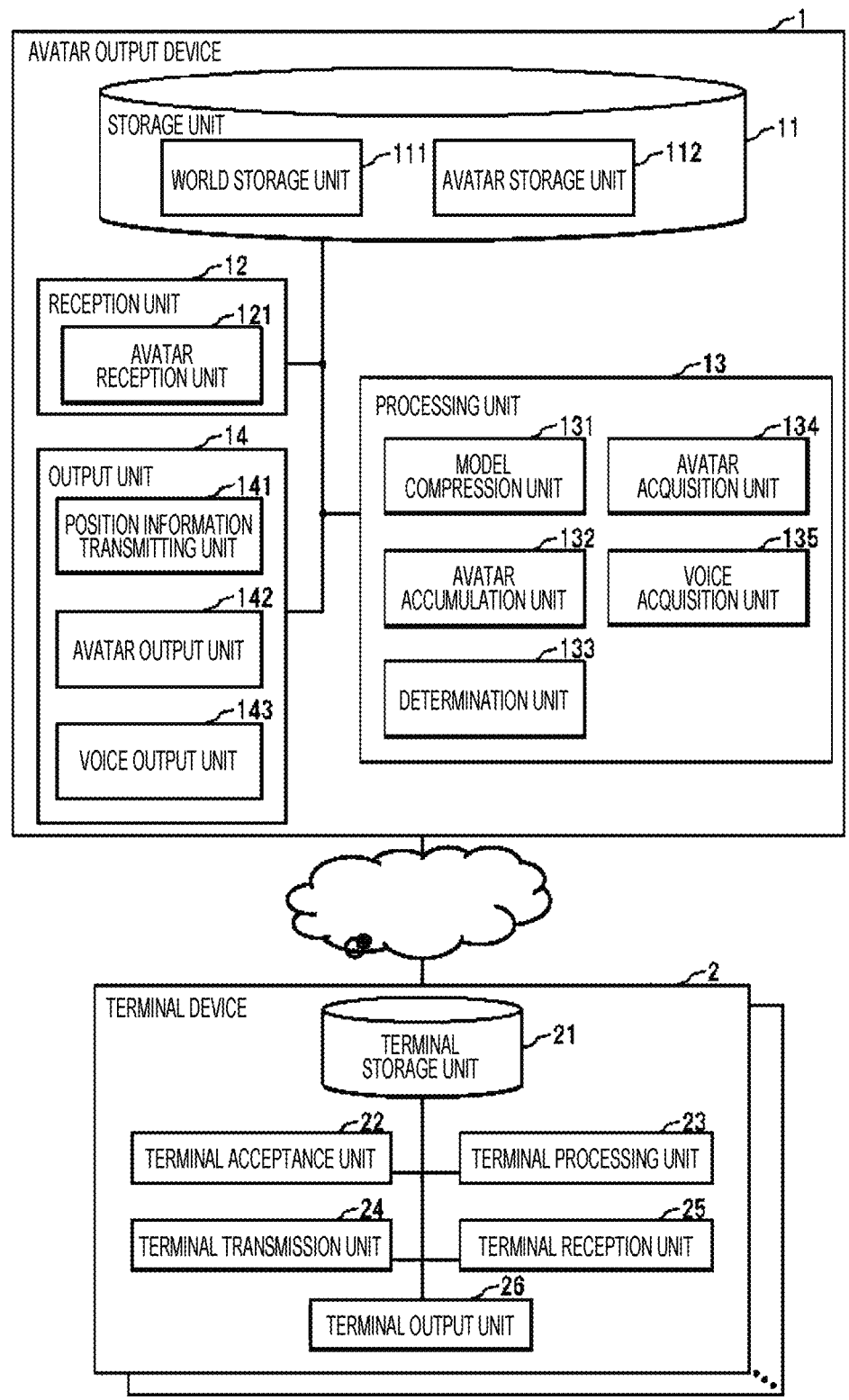
FIG. 2 is a block diagram of the information system.

FIG. 2 is a block diagram of the information system A according to the present embodiment. The avatar output device 1 constituting the information system A includes a storage unit 11, a reception unit 12, a processing unit 13, and an output unit 14.

The storage unit 11 includes a world storage unit 111 and an avatar storage unit 112. The reception unit 12 includes, for example, an avatar reception unit 121. The processing unit 13 includes, for example, a model compression unit 131, an avatar accumulation unit 132, a determination unit 133, an avatar acquisition unit 134, and a voice acquisition unit 135. The output unit 14 includes, for example, a position information transmitting unit 141, an avatar output unit 142, and a voice output unit 143.

The terminal device 2 includes a terminal storage unit 21, a terminal acceptance unit 22, a terminal processing unit 23, a terminal transmission unit 24, a terminal reception unit 25, and a terminal output unit 26.

The storage unit 11 constituting the avatar output device 1 stores various types of information. The various types of information are, for example, world information to be described later and avatar information to be described later.

The world storage unit 111 stores the world information. The world information is information for constituting a world. The structure of the world information is not particularly limited.

The avatar storage unit 112 stores one or more pieces of avatar information. The avatar information includes information for constructing an avatar to be output. The avatar information is information for each avatar. The avatar information is associated with an avatar identifier. Associating with the avatar identifier may include having the avatar identifier. The avatar identifier is, for example, an avatar identification (ID), but may be an ID of the user or an ID of the terminal device 2 corresponding to the avatar, or the like.

The avatar information includes model information. The model information is information for constructing the display of the avatar. The model information includes, for example, mesh information, bone information, and material information. The model information has, for example, a data structure of glTF (GL Transmission Format). However, the data structure of the model information may be VRM, OBJ, FBX, STL, GLB, COLLADA, or the like, and may be of any type.

Each avatar information here can have two or more types of model information having different data sizes. The avatar information includes, for example, first model information and second model information. Here, "data size of first model information> data size of second model information" is established. The second model information is, for example, model information obtained by compressing the data size of the first model information. Note that the compression algorithm is not limited. The second model information is, for example, model information obtained by constructing one piece of mesh information from two or more pieces of mesh information (integrating meshes) among pieces of mesh information included in the first model information and reducing the pieces of mesh information. In addition, the second model information is, for example, model information in which the data size is reduced by reducing the gradation of color information included in the first model information. The second model information is, for example, model information in which the data size is reduced by unifying the textures included in the first model information.

Note that the first model information is, for example, information transmitted from the terminal device 2 in association with the avatar identifier. Note that the avatar identifier may be a terminal identifier. In addition, the first model information may be, for example, information acquired using original information transmitted from the terminal device 2. The original information may be model information or an identifier for specifying the model information.

The avatar information includes voice information and one or more attribute values in addition to the model information.

The voice information is information of a voice uttered by the avatar. The data structure and the data format of the voice information are not limited. The avatar information has two or more types of voice information having different data sizes or different attribute values. The avatar information includes, for example, first voice information and second voice information. For example, "data size of first voice information> data size of second voice information" is established. Further, "volume which is attribute value of first voice information> volume which is attribute value of second voice information" is established, for example. Further, "sampling frequency which is attribute value of first voice information> sampling frequency which is attribute value of second voice information" is established, for example. Further, "height (frequency) which is attribute value of first voice information> height (frequency) which is attribute value of second voice information" is established, for example.

Each of the one or more attribute values is an attribute value of the avatar. The attribute value is, for example, a dynamic attribute value or a static attribute value.

The dynamic attribute value is an attribute value that can dynamically change. The dynamic attribute value is, for example, position information or orientation information.

The position information is information for specifying the position of the avatar in the field. The position information is, for example, position information input by the user. The position information input by the user is generally information determined by an operation performed by the user operating the avatar. The position information is information for specifying an absolute position in the field (also referred to as a world), and is, for example, three-dimensional coordinates (x, y, z) or two-dimensional coordinates (x, y).

The orientation information is information for specifying the orientation of the avatar in the field. The orientation information is, for example, an angle with respect to a reference direction. The reference direction is information for specifying an absolute orientation in the field (also referred to as a world). The orientation information is, for example, information indicating whether or not the avatar faces the front in the field.

The static attribute value is an attribute value that does not dynamically change. The static attribute value is, for example, a role attribute value, an origin attribute value, or a terminal attribute value.

The role attribute value is information regarding the role of the avatar. The role attribute value is, for example, "organizer", "master of ceremony (MC)", or "audience". Note that the "organizer" refers to an organizer of an event held in the virtual three-dimensional space using avatars. The "MC" refers to an MC of an event held in the virtual three-dimensional space using avatars. The "audience" refers to audience of an event held in the virtual three-dimensional space using avatars.

The origin attribute value is information regarding the origin of the avatar. The origin attribute value is, for example, information indicating whether or not the avatar is created by the user (whether or not the avatar is user-generated content (UGC)).

The terminal attribute value is information regarding the terminal device 2 corresponding to the avatar. The terminal attribute value is, for example, a terminal type identifier (for example, "personal computer (PC)", "smartphone", and "tablet") for specifying the type of the terminal device 2, information (e.g., power level, operating frequency (GHz))

for specifying the power of the processor of the terminal device 2, a screen size and an aspect ratio of the terminal device 2.

The reception unit 12 receives various types of information and instructions. Note that the reception here normally refers to reception from the terminal device 2, but may refer to, for example, reception of information input from an input device such as a keyboard, a mouse, or a touch panel, or reception of information read from a recording medium such as an optical disk, a magnetic disk, or a semiconductor memory.

The various types of information and instructions are, for example, avatar information, voice information, and a request. The avatar information to be received may not have the same structure as the avatar information in the avatar storage unit 112. The avatar information to be received includes, for example, the first model information and the position information.

The request is a request for sending an avatar. The request is, for example, a request related to display of the other avatar, and includes one or more sets of an avatar identifier indicating the other avatar and model information. The request may include, for example, an instruction to transmit world information.

The avatar reception unit 121 receives the first model information or the original information from each of two or more terminal devices 2 used by the users. The original information is information that is an original of the first model information. The original information is, for example, the model information, but may be an identifier of the first model information.

Additionally, the avatar reception unit 121 can also receive, from each of two or more terminal devices 2, position information specifying the position of the avatar corresponding to each terminal device 2. Note that the avatar reception unit 121 receives, from each of two or more terminal devices 2, the first model information or the original information, the position information, and the avatar identifier in association with each other. However, it is sufficient that the first model information or the original information and the position information are associated with each other, and they may be received separately. Note that the avatar identifier is information for identifying the avatar, and is, for example, an ID or a username. Furthermore, a unique avatar identifier may be acquired in response to the avatar reception unit 121 receiving the first model information or the original information from the terminal device 2.

The avatar reception unit 121 also receives voice information and position information. The avatar reception unit 121 receives the voice information in association with the avatar identifier.

The avatar reception unit 121 may receive the avatar information including the first model information and the second model information from each of two or more terminal devices 2. In such a case, the terminal device 2 may perform processing of acquiring the second model information based on the first model information.

Additionally, the avatar reception unit 121 can receive, from each of two or more terminal devices 2, the score or the determination result of one or more other avatars acquired by each terminal device 2 in association with the avatar identifier. The avatar reception unit 121 may also receive the score or the determination result of the host avatar for each terminal device 2. Note that the determination result is information for determining the type of the model information of the avatar. The determination result is, for example, information determined based on the score. The determination result is, for example, a type identifier for specifying the type of the model information. The determination result is, for example, "first" corresponding to the first model information and "second" corresponding to the second model information.

Note that the other avatar is an avatar that is not the host avatar. The host avatar is an avatar corresponding to the terminal device 2. When the avatar reception unit 121 does not receive the score of the host avatar, the score of the host avatar is ordinarily a default value (for example, the highest score). Note that the score of the other avatar for the terminal device 2 is information for specifying the importance of the other avatar for the terminal device 2. The score is, for example, based on a scale of 0 to 100 or 1 to 10, but the assessment mode is not particularly limited.

The processing unit 13 performs various types of processing. The various types of processing include, for example, processing performed by the model compression unit 131, the avatar accumulation unit 132, the determination unit 133, the avatar acquisition unit 134, and the voice acquisition unit 135.

The processing unit 13 acquires, for example, the world information in the world storage unit 111.

The model compression unit 131 acquires the second model information using the first model information or the original information. The second model information is model information having a data size smaller than that of the first model information.

Note that the processing performed by the model compression unit 131 is not particularly limited. For example, the model compression unit 131 constructs one piece of mesh information from two or more pieces of mesh information included in the first model information or the original information, and acquires the second model information in which the number of pieces of mesh information is reduced. In such a case, the second model information is, for example, model information having M (M is a natural number of 1 or more) mesh information acquired using N (N is a natural number of 2 or more) mesh information included in the first model information, M being less than N.

Alternatively, the model compression unit 131 acquires the second model information in which the data size is reduced by reducing the gradation of color information included in the first model information or the original information, for example. The model compression unit 131 acquires the second model information having a reduced data size by unifying textures included in the first model information or the original information, for example.

In one aspect, the model compression unit 131 compresses only information of a part of the avatar (for example, a portion other than the body portion and the face portion) included in the first model information to acquire the second model information.

The avatar accumulation unit 132 accumulates, in the avatar storage unit 112, the avatar information including the first model information received by the avatar reception unit 121 or the first model information acquired using the original information received by the avatar reception unit 121.

The avatar accumulation unit 132 accumulates, in the avatar storage unit 112, avatar information also including one or more pieces of the position information and the voice information received by the avatar reception unit 121, for example.

The avatar accumulation unit 132 accumulates, for example, the avatar information including the first model information and the second model information in the avatar storage unit 112.

The avatar accumulation unit 132 accumulates, for example, the avatar information including the first model information and the second model information acquired by the model compression unit 131 in the avatar storage unit 112.

Note that the accumulation processing performed by the avatar accumulation unit 132 may be temporary accumulation.

The determination unit 133 determines one or more first avatars and one or more second avatars among the two or more avatars. Note that the first avatar is an avatar displayed using the first model information. The second avatar is an avatar displayed using the second model information. Note that the determination processing includes, for example, acquiring a type identifier corresponding to the score or the determination result paired with the avatar identifier, and acquiring a type identifier received from the terminal device 2. The type identifier is, for example, a "first avatar" or a "second avatar".

For example, the determination unit 133 acquires, for each avatar identifier included in the received request, a type identifier corresponding to the score or the determination result paired with the avatar identifier.

In a case where there are three or more types of model information, the determination unit 133 determines one or more first avatars, one or more second avatars, and one or more third avatars among the three or more avatars.

The determination unit 133 determines which one of at least two or more types each of the two or more avatars has. The determination unit 133 may determine which one of three or more types each of the two or more avatars has. Note that the avatar commonly corresponds to the user or the terminal device 2.

The determination unit 133 generally determines one or more first avatars and one or more second avatars for each terminal device 2. That is, the type of the model information is different depending on terminal devices 2 even in the same other avatar.

The determination unit 133 determines, for each of two or more terminal devices 2, the one or more second avatars based on the score acquired using one or more dynamic attribute values corresponding to the two or more avatars.

The determination unit 133 may determine one or more second avatars using information based on one or more static attribute values corresponding to two or more avatars.

The determination unit 133 uses the score or the determination result to determine, for each of two or more terminal devices, one or more first avatars and one or more second avatars from the two or more avatars. Note that the score or the determination result may be information received from the terminal device 2 or information acquired by the avatar output device 1.

The determination unit 133 determines the first avatar and the second avatar based on, for example, the score or the determination result.

For example, the determination unit 133 determines, as the first avatar, an avatar identified by an avatar identifier paired with a score that is high enough to satisfy a score condition, and determines, as the second avatar, an avatar identified by an avatar identifier paired with a score that is low enough not to satisfy the score condition.

The score condition is defined, for example, such that "the score is equal to or greater than a threshold value", "the score is greater than the threshold value", "the score is within the top N (N is a natural number)", or "the score is higher than the top N (N is a natural number)".

For example, the determination unit 133 determines the avatar identified by the avatar identifier paired with the determination result "first" as the first avatar, and determines the avatar identified by the avatar identifier paired with the determination result "second" as the second avatar.

For example, the determination unit 133 uses the score or the determination result of each of one or more other avatars received from the terminal device 2 to determine which one of the two or more types each of the other avatars has.

For example, the determination unit 133 performs score acquisition processing for each of one or more other avatars using one or more attribute values received from the terminal device 2, and determines which one of the two or more types each of the other avatars has based on score. Note that the score acquisition processing may be performed by each terminal device 2.

The determination unit 133 performs, for example, the following score acquisition processing. That is, the determination unit 133 uses the one or more attribute values received from the two or more terminal devices 2 and the position information of each avatar to acquire the score of one or more other avatars for each of the two or more terminal devices 2. Note that the one or more attribute values received from each terminal device 2 include, for example, position information of the host avatar and orientation information of the host avatar.

Specifically, for example, the determination unit 133 acquires the dynamic attribute value of one or more other avatars using two or more pieces of information among the position information of the host avatar received from the terminal device 2, the orientation information of the host avatar received from the terminal device 2, a camera attribute value, and the position information of one or more other avatars. Note that the camera attribute value is, for example, camera position information for specifying the position of the camera, camera orientation information for specifying the orientation of the camera, or angle of view information for specifying the angle of view of the camera. The camera attribute value is stored in the storage unit 11, for example. In addition, the angle of view information generally indicates an angular range of the camera in the horizontal direction and an angular range of the camera in the vertical direction. Note that the camera here refers to a camera installed in the virtual three-dimensional space.

The determination unit 133 uses, for example, the position information of the host avatar and the position information of the other avatar to acquire the distance between the host avatar and the other avatar. The determination unit 133 also uses, for example, the position information of the host avatar, the orientation information of the host avatar, and the position information of the other avatar to acquire a dynamic attribute value (which may be referred to as an in-view attribute value) indicating whether or not the other avatar is within the visual field of the host avatar. The determination unit 133 also uses, for example, the camera position information, the camera orientation information, the angle of view information, and the position information of the other avatar to acquire a dynamic attribute value (which may be referred to as an imaging range attribute value) indicating whether or not the other avatar is within the imaging range of the camera.

Then, the determination unit 133 acquires a larger score as the other avatar is positioned closer to the host avatar, for example. In addition, the determination unit 133 acquires a larger score when the other avatar is within the visual field than when the other avatar is not within the visual field, for example. In addition, the determination unit 133 acquires a larger score when the other avatar is within the imaging range of the camera than when the other avatar is not within the imaging range of the camera, for example.

More specifically, for example, the determination unit 133 acquires the score of the other avatar by a decreasing function using the distance as a parameter. For example, the determination unit 133 acquires a score corresponding to the distance, the in-view attribute value, and the imaging range attribute value from a correspondence table. In such a case, the correspondence table is, for example, a table having two or more pieces of correspondence information indicating correspondence between a set of the distance range, the in-view attribute value, and the imaging range attribute value and the score.

In addition, the determination unit 133 may perform the following score acquisition processing using, for example, one or more static attribute values. Note that the one or more static attribute values include, for example, either an attribute value related to the role of the avatar or an attribute value related to the origin of the avatar.

For example, in a case where the role of the other avatar is "organizer" or "MC", the determination unit 133 acquires a higher score than in a case where the role of the other avatar is "audience". For example, the determination unit 133 acquires a higher score in a case where the other avatar is UGC than in a case where the other avatar is not the UGC.

The determination unit 133 may make the determination based on, for example, only the in-view attribute value or the imaging range attribute value. The algorithm of the determination processing by the determination unit 133 is not particularly limited. In addition, in a case where the determination unit 133 acquires a score, an algorithm for acquiring the score is not particularly limited.

For example, the determination unit 133 determines, among two or more avatars, one or more first avatars that are avatars corresponding to the first voice information and one or more second avatars that are avatars corresponding to the second voice information. Note that the second voice information is voice information having a data size smaller than that of the first voice information or voice information having an attribute value different from that of the first voice information. Note that the different attribute values are, for example, volume and frequency.

The determination unit 133 determines, for example, the type of the voice information of the other avatar based on the score or the determination result of the other avatar. For example, the determination unit 133 determines the type such as the first avatar or the second avatar based on the score of the other avatar or the determination result, and determines the type of the voice information corresponding to the determined type.

The avatar acquisition unit 134 acquires an avatar using the second model information from the avatar storage unit 112 for each of the one or more second avatars determined by the determination unit 133, and acquires an avatar using the first model information from the avatar storage unit 112 for each of the one or more first avatars.

Acquiring the avatar may include acquiring the model information, acquiring the avatar information including the model information, acquiring the avatar information including the model information and the voice information, acquiring the model identifier (for example, information for identifying whether the avatar is the first avatar or the second avatar, and information for identifying the type of the model information) for identifying the model information, or acquiring a voice identifier (for example, information for identifying whether the avatar is the first avatar or the second avatar, and information for identifying a type of voice information) for identifying the voice information.

For one or more second avatars determined by the determination unit 133, the avatar acquisition unit 134 reads the second model information and constructs an avatar using the second model information, for example.

The voice acquisition unit 135 acquires the second voice information for each of the one or more second avatars determined by the determination unit 133, and acquires the first voice information for each of the one or more first avatars.

The output unit 14 outputs various types of information. Here, the output generally means transmission to the terminal device 2, but may be a concept including, for example, display on a display, projection using a projector, printing by a printer, sound output, accumulation on a recording medium, and delivery of a processing result to another processing device, another program, or the like.

The output unit 14 transmits, for example, the world information in the world storage unit 111 to each of the two or more terminal devices 2.

The position information transmitting unit 141 transmits the position information of one or more other avatars among the position information of the two or more avatars corresponding to the two or more terminal devices 2 to the two or more terminal devices in association with the avatar identifier for identifying the avatar. The position information of one or more other avatars is, for example, information transmitted by the terminal device 2 corresponding to each of the other avatars. The position information of one or more other avatars may not include the position information of the host avatar in each terminal device 2. The position information transmitting unit 141 may transmit or may not transmit, to each of the two or more terminal devices 2, the position information of the host avatar corresponding to the terminal device 2.

The avatar output unit 142 outputs two or more avatars acquired by the avatar acquisition unit 134. Here, the output generally means transmission to the terminal device 2, but may be a concept including, for example, display on a display, projection using a projector, accumulation on a recording medium, and delivery of a processing result to another processing device, another program, or the like.

In addition, outputting the avatar may include transmitting model information or transmitting a model identifier. In one aspect, it is sufficient that the avatar is output to the terminal device 2.

The avatar output unit 142 normally transmits the two or more avatars acquired by the avatar acquisition unit 134 to each of the two or more terminal devices 2 for each of the two or more terminal devices 2.

Using each of one or more avatar identifiers included in the received request, the avatar output unit 142 transmits information including model information corresponding to the avatar identifier and the avatar identifier in pairs to the terminal device 2 that has transmitted the request.

In a case where the received request includes an instruction to transmit world information, the avatar output unit 142 transmits the world information to the terminal device 2 that has transmitted the request.

The avatar output by the avatar output unit 142 may not be completely the same as the information of the avatar displayed on the terminal device 2. The avatar output by the avatar output unit 142 may be information for constructing the avatar displayed on the terminal device 2. Outputting the avatar may be outputting an image including the avatar.

The voice output unit 143 outputs the first voice information and the second voice information acquired by the voice acquisition unit 135. Outputting the first voice information and the second voice information may be outputting an identifier for identifying the first voice information and an identifier for identifying the second voice information.

The voice output unit 143 outputs voice information of a type corresponding to the score or the determination result of the avatar.

Here, the output generally means transmission to the terminal device 2, but may be a concept including, for example, sound output, accumulation on a recording medium, and delivery of a processing result to another processing device, another program, or the like.

The first voice information and the second voice information output from the voice output unit 143 may not be the same as the voice output from the terminal device 2.

The terminal storage unit 21 constituting the terminal device 2 stores one or more terminal attribute values. The terminal attribute value is an attribute value of the terminal device 2. The attribute value of the terminal device 2 is, for example, a terminal type identifier of the terminal device 2, and a screen size and an aspect ratio of the terminal device 2. The terminal storage unit 21 may store position information, first model information, or original information.

The terminal acceptance unit 22 receives various types of instructions and information. The various types of instructions and information are, for example, position information, first model information, an identifier for identifying the first model information, an avatar identifier, one or more attribute values, and an initial input. The one or more attribute values include, for example, a role attribute value, an origin attribute value, and a terminal attribute value.

Note that the initial input is an input before the three-dimensional space including two or more avatars is output to the terminal device 2, and includes position information of the avatar. The initial input can include one or more score acquisition source attribute values. In one aspect, the initial input includes model information or original information of the avatar. The initial input may include an avatar identifier. In one aspect, the model information included in the initial input is the first model information. The score acquisition source attribute value is an attribute value that is a source from which the score is acquired, and includes position information. The score acquisition source attribute value generally includes orientation information.

Here, the reception is a concept including, for example, reception of information input from an input device such as a keyboard, a mouse, or a touch panel, reception of information transmitted via a wired or wireless communication line, and reception of information read from a recording medium such as an optical disk, a magnetic disk, or a semiconductor memory.

The terminal processing unit 23 performs various types of processing. The various types of processing include, for example, score acquisition processing to be described later and avatar constructing processing to be described later. Note that, in a case where the avatar output device 1 acquires the score, the terminal processing unit 23 does not perform the score acquisition processing.

The terminal processing unit 23 acquires the scores of one or more other avatars using, for example, the position information of one or more other avatars and one or more terminal attribute values.

The terminal processing unit 23 acquires the scores of one or more other avatars using, for example, the position information of one or more other avatars and the position information of the host avatar in one or more other terminal devices 2.

Specifically, the terminal processing unit 23 acquires dynamic attribute values of one or more other avatars using, for example, two or more pieces of information among position information of the host avatar, orientation information of the host avatar, camera position information, camera orientation information, angle of view information of the camera, and position information of one or more other avatars.

The terminal processing unit 23 uses, for example, the position information of the host avatar and the position information of the other avatar to acquire the distance between the host avatar and the other avatar. The terminal processing unit 23 also uses, for example, the position information of the host avatar, the orientation information of the host avatar, and the position information of the other avatar to acquire a dynamic attribute value (which may be referred to as an in-view attribute value) indicating whether or not the other avatar is within the visual field of the host avatar. The terminal processing unit 23 also uses, for example, the camera position information, the camera orientation information, the angle of view information, and the position information of the other avatar to acquire a dynamic attribute value (which may be referred to as an imaging range attribute value) indicating whether or not the other avatar is within the imaging range of the camera.

Then, the terminal processing unit 23 acquires a larger score as the other avatar is positioned closer to the host avatar in the three-dimensional space, for example. In addition, the terminal processing unit 23 acquires a larger score when the other avatar is within the visual field of the host avatar than when the other avatar is not within the visual field of the host avatar, for example. In addition, the terminal processing unit 23 acquires a larger score when the other avatar is within the imaging range of the camera than when the other avatar is not within the imaging range of the camera, for example.

The terminal processing unit 23 acquires a larger score as the other avatar is positioned closer to the camera.

More specifically, for example, the terminal processing unit 23 acquires the score of the other avatar by a decreasing function using the distance as a parameter. For example, the terminal processing unit 23 acquires a score corresponding to the distance, the in-view attribute value, and the imaging range attribute value from the correspondence table. In such a case, the correspondence table is, for example, a table having two or more pieces of correspondence information indicating correspondence between a set of the distance range, the in-view attribute value, and the imaging range attribute value and the score.

In addition, the terminal processing unit 23 may perform the following score acquisition processing using, for example, one or more static attribute values of the other avatar.

The one or more static attribute values include, for example, either an attribute value related to the role of the other avatar or an attribute value related to the origin of the other avatar. For example, the terminal processing unit 23 acquires a higher score when the role of the other avatar is "organizer" or "MC" than when the role of the other avatar is "audience". For example, the terminal processing unit 23 acquires a higher score when the other avatar is UGC than when the other avatar is not the UGC.

In addition, the terminal processing unit 23 may acquire the determination result corresponding to each of the one or more other avatars using, for example, the score of each of the one or more other avatars. The terminal processing unit 23 refers to the correspondence table having two or more pieces of correspondence information indicating the correspondence between the range of the score and the determination result, and acquires the determination result paired with the score for each of the other avatars. For example, the terminal processing unit 23 substitutes the score into an arithmetic expression using the score as a parameter, calculates the arithmetic expression, and acquires a determination result. Note that the determination result is a result of determination as to which one of two or more avatars (for example, the first avatar and the second avatar) is to be used when outputting the other avatar.

Furthermore, for example, the terminal processing unit 23 acquires model information for one or more other avatars from the avatar output device 1, and performs avatar constructing processing of constructing the avatar to be displayed, using the model information. Note that the avatar constructing processing is a known technique.

In addition, the terminal processing unit 23 constructs a world using the received world information, places two or more avatars in the world, and constructs a three-dimensional space in which the avatars are placed. Note that the terminal processing unit 23 places each of the two or more avatars at a position specified by the corresponding position information.

The terminal transmission unit 24 transmits various types of information to the avatar output device 1. For example, the terminal transmission unit 24 transmits the position information of the host avatar corresponding to the terminal device 2 to the avatar output device 1. For example, the terminal transmission unit 24 transmits one or more attribute values in the terminal storage unit 21 to the avatar output device 1. The one or more attribute values include, for example, position information of the host avatar, orientation information of the host avatar, and a terminal attribute value.

The terminal transmission unit 24 transmits the score or the determination result of one or more other avatars to the avatar output device 1 in association with the terminal identifier of the terminal device 2. Note that the score or the determination result transmitted here is information acquired by the terminal processing unit 23. In addition, the score or the determination result is associated with the avatar identifier of the other avatar. Note that, in a case where the avatar output device 1 acquires scores, the terminal transmission unit 24 does not transmit the scores to the avatar output device 1. When the avatar output device 1 acquires the determination result, the terminal transmission unit 24 does not transmit the determination result to the avatar output device 1.

The terminal reception unit 25 receives the position information of the other avatars corresponding to one or more other terminal devices 2 from the avatar output device 1. The terminal reception unit 25 receives, for example, one or more attribute values of the other avatars from the avatar output device 1.

The terminal reception unit 25 receives, from the avatar output device 1, different pieces of model information of the other avatars corresponding to the score or the determination result.

The terminal reception unit 25 may receive two or more types of model information for each avatar. In that case, the terminal processing unit 23 determines the model information to be used when displaying the other avatar according to the score or the determination result of the other avatar.

In one aspect, the terminal reception unit 25 also receives world information from the avatar output device 1.

The terminal output unit 26 displays one or more other avatars constructed using one or more pieces of model information. Note that the display may be transmission to another display medium. The model information is one of two or more types of model information.

The terminal output unit 26 also displays the host avatar.

The terminal output unit 26 displays the world also using the world information.

The terminal output unit 26 outputs the voice information corresponding to the avatar. The voice information to be output is voice information (for example, first or second voice information) of a type corresponding to the score or the determination result of the avatar.

The storage unit 11, the world storage unit 111, the avatar storage unit 112, and the terminal storage unit 21 are nonvolatile recording media, but can also be implemented by volatile recording media.

The process of storing information in the storage unit 11 or the like is not particularly limited. For example, information may be stored in the storage unit 11 or the like via a recording medium, information transmitted via a communication line or the like may be stored in the storage unit 11 or the like, or information input via an input device may be stored in the storage unit 11 or the like.

The reception unit 12, the avatar reception unit 121, and the terminal reception unit 25 are typically achieved by wireless or wired communication means.

The processing unit 13, the model compression unit 131, the avatar accumulation unit 132, the determination unit 133, the avatar acquisition unit 134, the voice acquisition unit 135, and the terminal processing unit 23 can be typically achieved by a processor, a memory, or the like. The procedure of the processing performed by the processing unit 13 and the like is typically achieved by software, and the software is recorded in a recording medium such as a read-only memory (ROM). However, it may be achieved by hardware (dedicated circuit). Note that the processor is a microprocessor unit (MPU), a central processing unit (CPU), a graphics processing unit (GPU), or the like, and the type of the processor is not particularly limited.

The output unit 14, the position information transmitting unit 141, the avatar output unit 142, and the voice output unit 143 are typically achieved by wireless or wired communication means.

The terminal acceptance unit 22 can be achieved by a device driver of input means such as a touch panel or a keyboard, control software of a menu screen, or the like.

The terminal output unit 26 may be considered to include or not include an output device such as a display or a speaker. The terminal output unit 26 can be achieved by driver software of an output device, or driver software of an output device and the output device together.

Next, an operation example of the information system A will be described. First, an operation example of the avatar output device 1 will be described with reference to the flowchart of FIG. 3.

(Step S301) The avatar reception unit 121 determines whether or not model information and the like have been received from the terminal device 2. When the model information and the like have been received, the process proceeds to step S302, and when the model information and the like have not been received, the process proceeds to step S303. Note that the model information and the like are information including the first model information or the original information of the avatar corresponding to the terminal device 2. The model information and the like can include, for example, position information of the avatar corresponding to the terminal device 2. The model information and the like may include an avatar identifier. Note that the processing unit 13 may acquire a unique avatar identifier as the avatar identifier in response to the model information and the like. A method for acquiring the unique avatar identifier is not particularly limited. In step S301, model information and the like are received from two or more terminal devices 2.

(Step S302) The avatar accumulation unit 132 accumulates the received model information and the like in association with the avatar identifiers. The process returns to step S301.

(Step S303) The processing unit 13 determines whether to start the compression processing and the like. When the compression processing and the like are to be started, the process proceeds to step S304, and when the compression processing and the like are not to be started, the process proceeds to step S312. Note that the compression processing and the like correspond to the processes of steps S304 to S311. In addition, conditions for starting the compression processing and the like are not particularly limited. Such a condition is that, for example, a predetermined time has come and that the processing unit 13 has determined that model information and the like have been received from all the terminal devices 2 scheduled to participate. Furthermore, such a condition is that, for example, the reception unit 12 has received a request for the compression processing and the like from the terminal device 2.

(Step S304) The processing unit 13 substitutes 1 into a counter i.

(Step S305) It is determined whether or not there is the avatar identifier of the i-th avatar to be subjected to the compression processing and the like. When there is the i-th avatar identifier, the process proceeds to step S306, and when there is no i-th avatar identifier, the process proceeds to step S310.

(Step S306) The model compression unit 131 acquires first model information of the i-th avatar identifier.

The model compression unit 131 may acquire the received first model information or may acquire the first model information corresponding to the received original information. That is, the model compression unit 131 acquires, for example, the first model information paired with the i-th avatar identifier from the avatar storage unit 112. For example, the model compression unit 131 acquires the original information paired with the i-th avatar identifier from the avatar storage unit 112, and acquires the first model information using the original information. In such a case, the original information is, for example, an identifier of the first model information or model information that is an original of the first model information.

(Step S307) The model compression unit 131 acquires one or more types of model information having a smaller data size than the first model information acquired in step S306. The one or more types of model information include second model information.

(Step S308) The avatar accumulation unit 132 accumulates the avatar information including the first model information and the second model information in the avatar storage unit 112 in association with the i-th avatar identifier. Note that accumulating the avatar information is obtaining a state in which the avatar information is accumulated, and the information originally stored in the avatar storage unit 112 does not need to be accumulated.

(Step S309) The processing unit 13 increments the counter i by 1. The process returns to step S305.

(Step S310) The processing unit 13 acquires one or more score acquisition source attribute values of all avatars in association with the avatar identifiers. Note that the score acquisition source attribute value is an attribute value that is a source from which the score is acquired, and includes position information. The score acquisition source attribute value generally includes orientation information.

(Step S311) The position information transmitting unit 141 transmits the one or more score acquisition source attribute values of each avatar acquired in step S310 to all the two or more terminal devices 2 in association with the avatar identifiers. The process returns to step S301.

(Step S312) The reception unit 12 determines whether or not a request has been received from the terminal device 2. When the request has been received, the process proceeds to step S313, and when the request has not been received, the process returns to step S301. Note that, in step S312, requests are received from all the two or more terminal devices 2. Note that the request includes a determination result or score of one or more other avatars associated with the avatar identifier.

(Step S313) The processing unit 13 performs avatar information acquisition processing. The avatar information acquisition processing is processing for acquiring model information and the like for displaying the avatar. In addition, the avatar information acquisition processing may acquire world information. An example of the avatar information acquisition processing will be described with reference to the flowchart of FIG. 4.

(Step S314) The avatar output unit 142 transmits the information acquired in step S313 to the terminal device 2 that has transmitted the request. The process returns to step S301. Note that the information to be transmitted generally includes the model information of the avatar.

Figure 3:
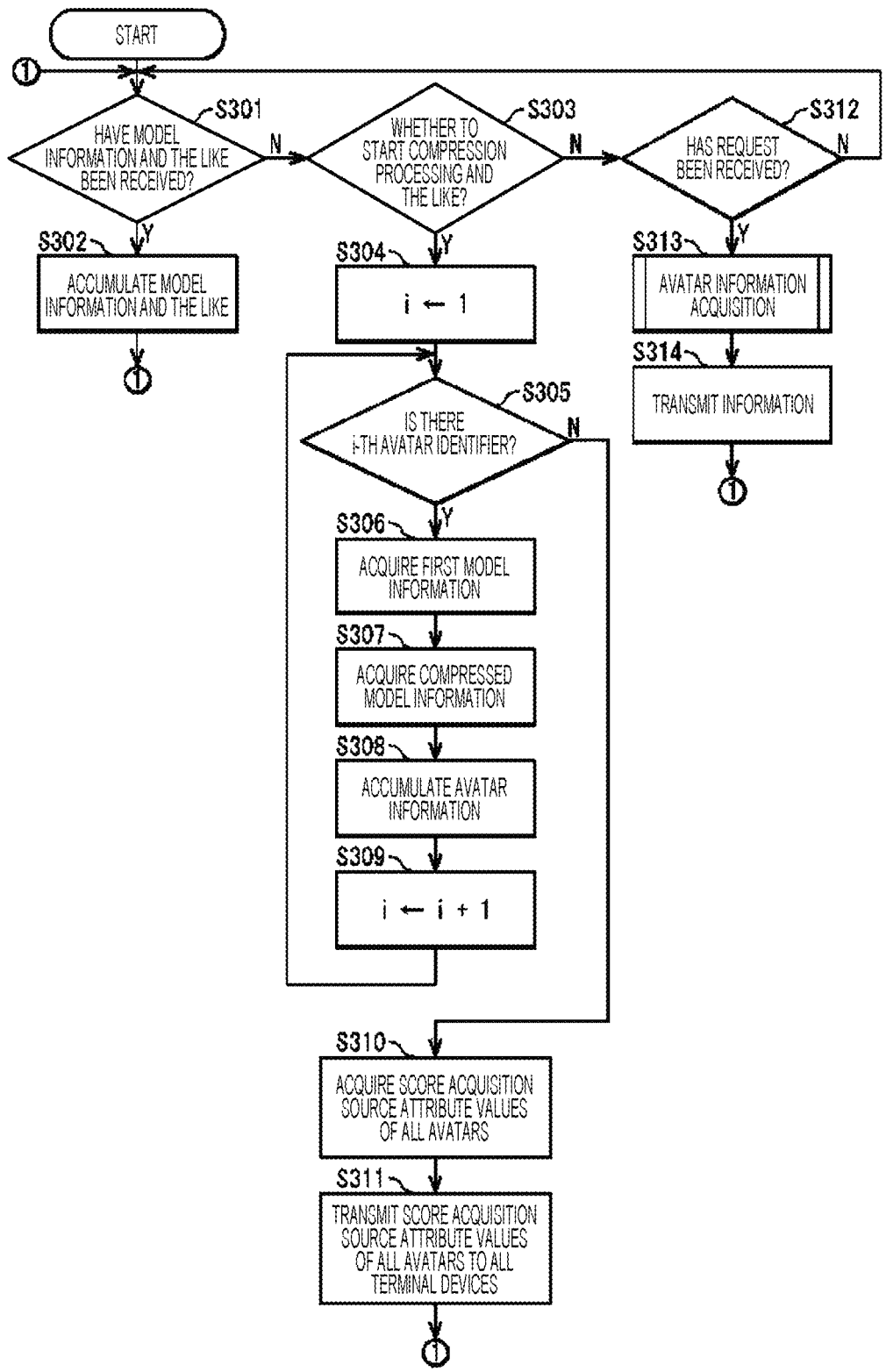
FIG. 3 is a flowchart for describing an operation example of an avatar output device according to one or more aspects of the disclosed subject matter.

Note that, in the flowchart of FIG. 3, the processing ends by interruption of power off or termination of the process.

Figure 4:
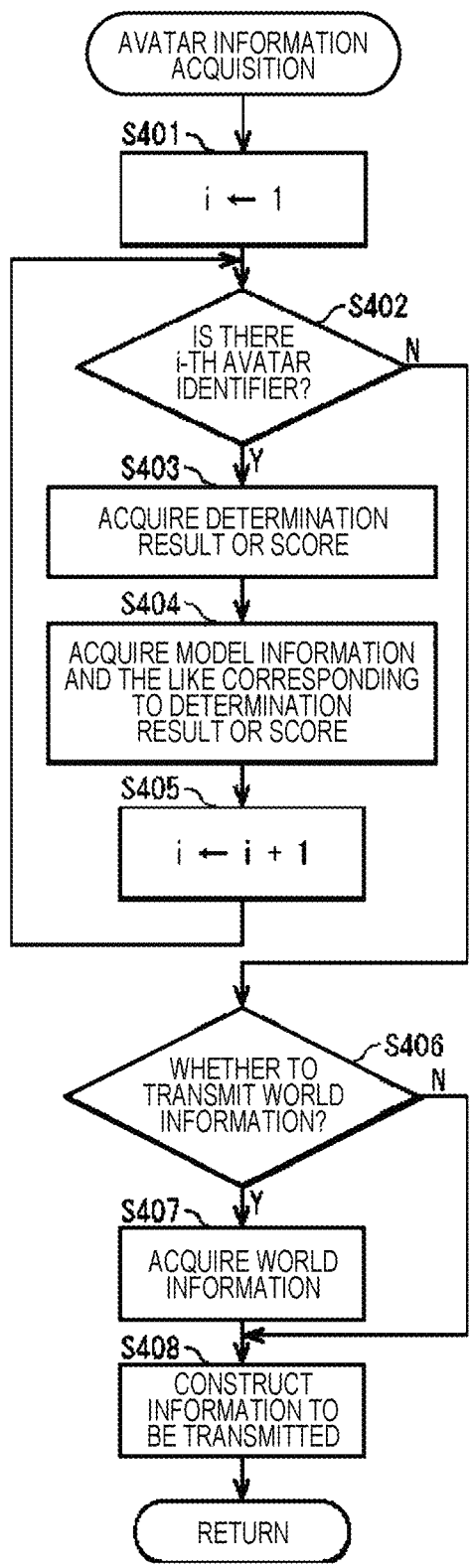
FIG. 4 is a flowchart for describing an example of avatar information acquisition processing according to one or more aspects of the disclosed subject matter.

Next, an example of the avatar information acquisition processing in step S313 will be described with reference to the flowchart of FIG. 4.

(Step S401) The determination unit 133 substitutes 1 into the counter i.

(Step S402) The determination unit 133 determines whether or not there is an i-th avatar identifier corresponding to the avatar information acquisition processing. When there is the i-th avatar identifier, the process proceeds to step S403, and when there is no i-th avatar identifier, the process proceeds to step S406. Note that the i-th avatar identifier is generally the i-th avatar identifier included in the received request.

(Step S403) The determination unit 133 acquires a determination result or score corresponding to the i-th avatar identifier. When the score is acquired, the determination unit 133 acquires the determination result corresponding to the acquired score. Note that the determination result is generally a type identifier that specifies the type of the model information to be acquired. The type identifier is, for example, "first" corresponding to the first model information and "second" corresponding to the second model information.

(Step S404) The avatar acquisition unit 134 acquires the i-th avatar identifier and the model information corresponding to the determination result in association with the i-th avatar identifier.

The avatar acquisition unit 134 acquires the model information from, for example, the avatar storage unit 112. The avatar acquisition unit 134 generates the model information from, for example, the first model information.

(Step S405) The determination unit 133 increments the counter i by 1. The process returns to step S402.

(Step S406) The avatar acquisition unit 134 determines whether to transmit world information. When the world information is to be transmitted, the process proceeds to step S407, and when the world information is not to be transmitted, the process proceeds to step S408. Note that the world information is generally transmitted when the world information has never been transmitted to the terminal device 2 since the start of the operation.

(Step S407) The avatar acquisition unit 134 acquires the world information from the world storage unit 111.

(Step S408) The avatar acquisition unit 134 constructs information including the model information associated with each of one or more avatar identifiers. The process returns to the upper routine.

Note that such information may include the world information. Such information is information to be transmitted to the terminal device 2.

Next, an operation example of the terminal device 2 will be described with reference to the flowchart of FIG. 5.

(Step S501) The terminal acceptance unit 22 determines whether or not an initial input that is an input before the start of the operation has been received. When the initial input has been received, the process proceeds to step S502, and when the initial input has not been received, the process proceeds to step S512. Note that the initial input includes one or more score acquisition source attribute values.

(Step S502) The terminal processing unit 23 constructs information to be transmitted using the initial input received in step S501. The terminal transmission unit 24 transmits the constructed information to the avatar output device 1. Note that the information includes, for example, model information, position information, and orientation information.

(Step S503) The terminal reception unit 25 determines whether or not the score acquisition source attribute values of all the avatars have been received in response to the transmission in step S502. When the score acquisition source attribute values have been received, the process proceeds to step S504, and when the score acquisition source attribute values have not been received, the process returns to step S503. Note that the terminal reception unit 25 receives one or more score acquisition source attribute values for each avatar in association with the avatar identifier of each avatar.

(Step S504) The terminal processing unit 23 acquires the score of each avatar using one or more score acquisition source attribute values of each avatar. An example of the score acquisition processing will be described with reference to the flowchart of FIG. 6. Note that, in the score acquisition processing, the terminal processing unit 23 may acquire the score and acquire the determination result using the score. In the score acquisition processing, the terminal processing unit 23 may acquire the score and may not acquire the determination result. In that case, the avatar output device 1 acquires the determination result.

(Step S505) The terminal processing unit 23 creates a request using the score or the determination result acquired in step S504. Note that the request has the score or the determination result associated with the avatar identifier of each avatar.

(Step S506) The terminal transmission unit 24 transmits the request created in step S505 to the avatar output device 1. The request may include, for example, an avatar identifier corresponding to the score acquired for each of the other avatars, or an identifier corresponding to the determination result for each of the other avatars in a case where the terminal processing unit 23 acquires the determination result.

(Step S507) The terminal reception unit 25 determines whether or not information has been received in response to the transmission of the request in step S506. When the information has been received, the process proceeds to step S508, and when the information has not been received, the process returns to step S507. Note that the information generally includes model information of each of one or more avatars output by the avatar output device 1 in response to the request. In addition, the information includes world information. Further, the information may include voice information associated with each of one or more avatar identifiers. Furthermore, the received information is at least temporarily accumulated in the terminal storage unit 21.

(Step S508) The terminal processing unit 23 performs display information constructing processing using the information received in step S507. The display information constructing processing is processing of constructing information to be displayed on the terminal device 2. An example of the display information constructing processing will be described with reference to the flowchart of FIG. 7.

(Step S509) The terminal output unit 26 outputs the information constructed in step S508. Note that the information to be output generally includes the world and one or more avatars.

(Step S510) The terminal processing unit 23 determines whether or not the information received in step S507 includes voice information. When the information has voice information, the process proceeds to step S511, and when the information does not have voice information, the process returns to step S501.

(Step S511) The processing unit 13 and the like perform voice output processing. The process returns to step S501. An example of the voice output processing will be described with reference to the flowchart of FIG. 8.

(Step S512) The terminal acceptance unit 22 determines whether or not an input from the user has been received. When the input has been received, the process proceeds to step S513, and when the input has not been received, the process proceeds to step S519. Examples of the input from the user include an input of changing the position information of the host avatar, an input of changing the orientation information of the host avatar, and voice information of the host avatar.

(Step S513) The terminal processing unit 23 acquires the attribute value (for example, the changed position information of the host avatar, the changed orientation information of the host avatar, and the like) based on the input in step S512. The terminal processing unit 23 acquires a score to be changed based on the input. In addition, in a case where the information has been received in step S519, the terminal processing unit 23 acquires a score to be changed based on the received information. The score acquisition processing will be described with reference to the flowchart of FIG. 6.

(Step S514) The terminal processing unit 23 creates the request using the score or the determination result acquired in step S504. Note that the request has the score or the determination result associated with the avatar identifier of each avatar.

In addition, upon the second or subsequent transmission of the request, the terminal processing unit 23 creates a request regarding the avatar for which a score or a determination result different from the previous score or determination result is obtained. Such a request does not include the score or the determination result of an avatar that has not been changed in score or determination result. Such a request includes an avatar identifier of an avatar for which a different score or determination result has been obtained, and the score or the determination result.

In addition, in a case where, for example, there is no change in the score or the determination result of each avatar, a request may not be created in step S514.

(Step S515) The terminal processing unit 23 determines whether or not a request has been created in step S514. When the request has been created, the process proceeds to step S506, and when the request has not been created, the process proceeds to step S516.

(Step S516) The terminal processing unit 23 determines whether to transmit information corresponding to the input in step S512. When the information is to be transmitted, the process proceeds to step S517, and when the information is not to be transmitted, the process proceeds to step S508. Note that the information corresponding to the input is, for example, voice information input by the user, and information regarding the position and orientation of the new host avatar after the input.

(Step S517) The terminal processing unit 23 constructs transmission information corresponding to the input in step S512.

(Step S518) The terminal transmission unit 24 transmits the transmission information constructed in step S517 to the avatar output device 1 in pairs with the avatar identifier of the terminal device 2. The process proceeds to step S508.

(Step S519) The terminal reception unit determines whether or not information has been received from the avatar output device 1. When the information has been received, the process proceeds to step S513, and when the information has not been received, the process returns to step S501. Note that the information is, for example, voice information, changed position information of the other avatar, and changed orientation information of the other avatar.

Figure 5:
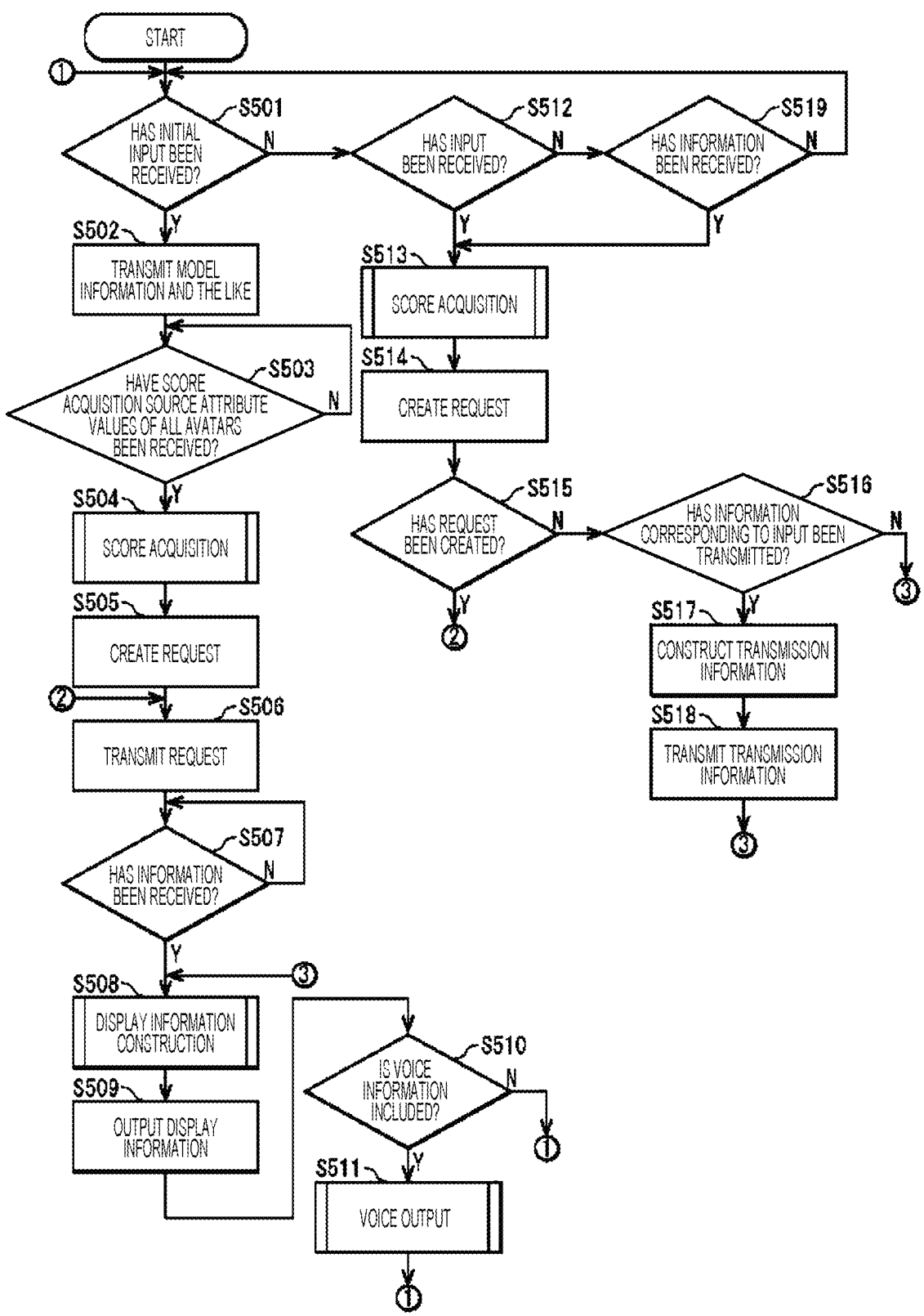
FIG. 5 is a flowchart for describing an operation example of a terminal device according to one or more aspects of the disclosed subject matter.

Note that, in the flowchart of FIG. 5, the processing ends by interruption of power off or termination of the process.

Next, an example of the score acquisition processing in step S504 will be described with reference to the flowchart of FIG. 6.

(Step S601) The terminal processing unit 23 acquires one or more attribute values for acquiring a score. The one or more attribute values here include position information of the host avatar. The one or more attribute values here include, for example, orientation information of the host avatar, camera position information, camera orientation information, and angle of view information of the camera.

(Step S602) The terminal processing unit 23 substitutes 1 into the counter i.

(Step S603) The terminal processing unit 23 determines whether or not there is the avatar identifier of the i-th avatar for which the score is to be acquired. When there is the i-th avatar identifier, the process proceeds to step S604, and when there is no i-th avatar identifier, the process returns to the upper routine.

(Step S604) The terminal processing unit 23 acquires one or more score acquisition source attribute values paired with the i-th avatar identifier. Note that the one or more score acquisition source attribute values include, for example, position information, orientation information, role attribute value, and origin attribute value of the i-th avatar.

(Step S605) The terminal processing unit 23 acquires a user visual-field attribute value using the position information of the host avatar, the orientation information of the host avatar, and the position information of the i-th avatar. Note that the user visual-field attribute value is information indicating whether or not the i-th avatar is within the visual field of the host avatar.

(Step S606) The terminal processing unit 23 acquires a camera field-of-view attribute value using the camera position information, the camera orientation information, the angle of view information of the camera, and the position information of the i-th avatar. Note that the camera field-of-view attribute value is information indicating whether or not the i-th avatar is within the imaging range of the camera.

(Step S607) The terminal processing unit 23 acquires a user distance attribute value using the position information of the host avatar and the position information of the i-th avatar. Note that the user distance attribute value is information for specifying the distance between the host avatar and the i-th avatar.

(Step S608) The terminal processing unit 23 acquires a user orientation attribute value using the orientation information of the host avatar and the orientation information of the i-th avatar. Note that the user orientation attribute value is information regarding a relative orientation between the host avatar and the i-th avatar, and is, for example, information regarding an angle between the host avatar and the i-th avatar, and information indicating whether or not the host avatar and the i-th avatar face each other.

(Step S609) The terminal processing unit 23 acquires a camera distance attribute value using the camera position information and the position information of the i-th avatar. Note that the camera distance attribute value is information for specifying the distance between the camera and the i-th avatar.

(Step S610) The terminal processing unit 23 acquires the score of the i-th avatar using one or more dynamic attribute values among the dynamic attribute values acquired in steps S605 to S609.

(Step S611) The terminal processing unit 23 uses the score of the i-th avatar to acquire the determination result of the i-th avatar. Here, the determination result is, for example, a type identifier. Note that the terminal processing unit 23 normally acquires a determination result corresponding to a larger data size as the score is higher.

(Step S612) The terminal processing unit 23 temporarily accumulates the determination result in association with the i-th avatar identifier. Note that the terminal processing unit 23 may temporarily accumulate the score in association with the i-th avatar identifier.

(Step S613) The terminal processing unit 23 increments the counter i by 1. The process returns to step S603.

Figure 6:
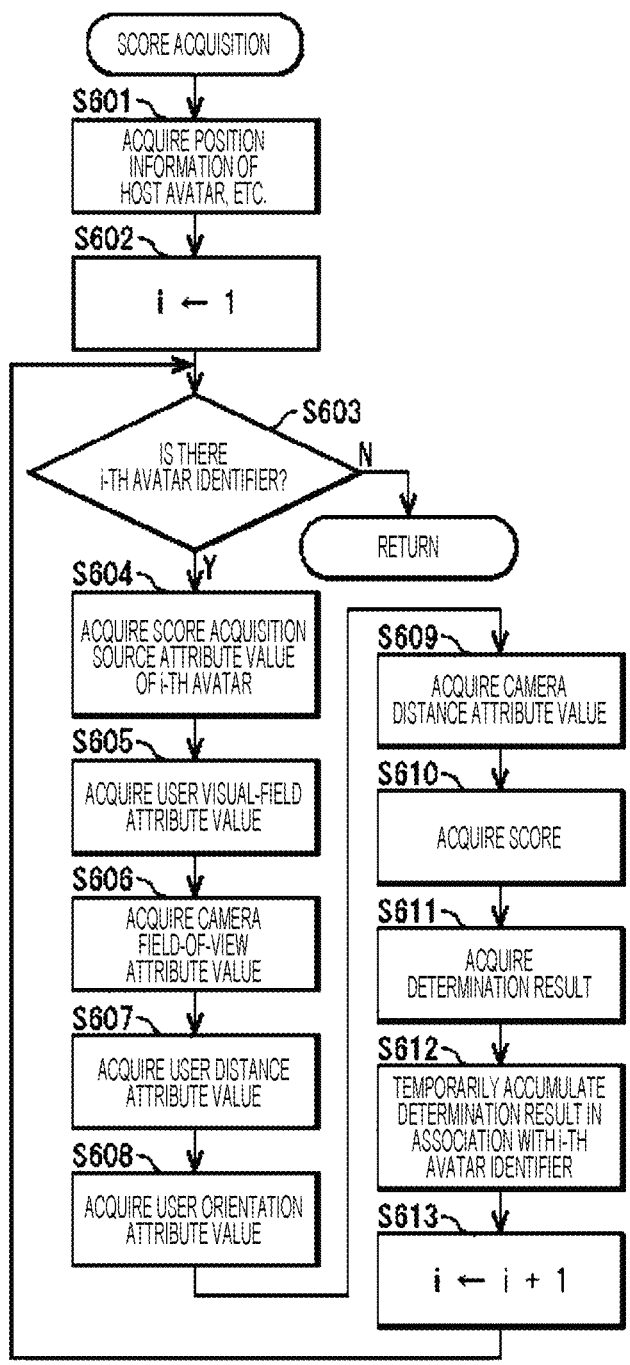
FIG. 6 is a flowchart for describing an example of score acquisition processing according to one or more aspects of the disclosed subject matter.

Note that, in the flowchart of FIG. 6, the terminal processing unit 23 may not acquire the determination result. In that case, the terminal processing unit 23 temporarily accumulates the score in association with the i-th avatar identifier.

Figure 7:
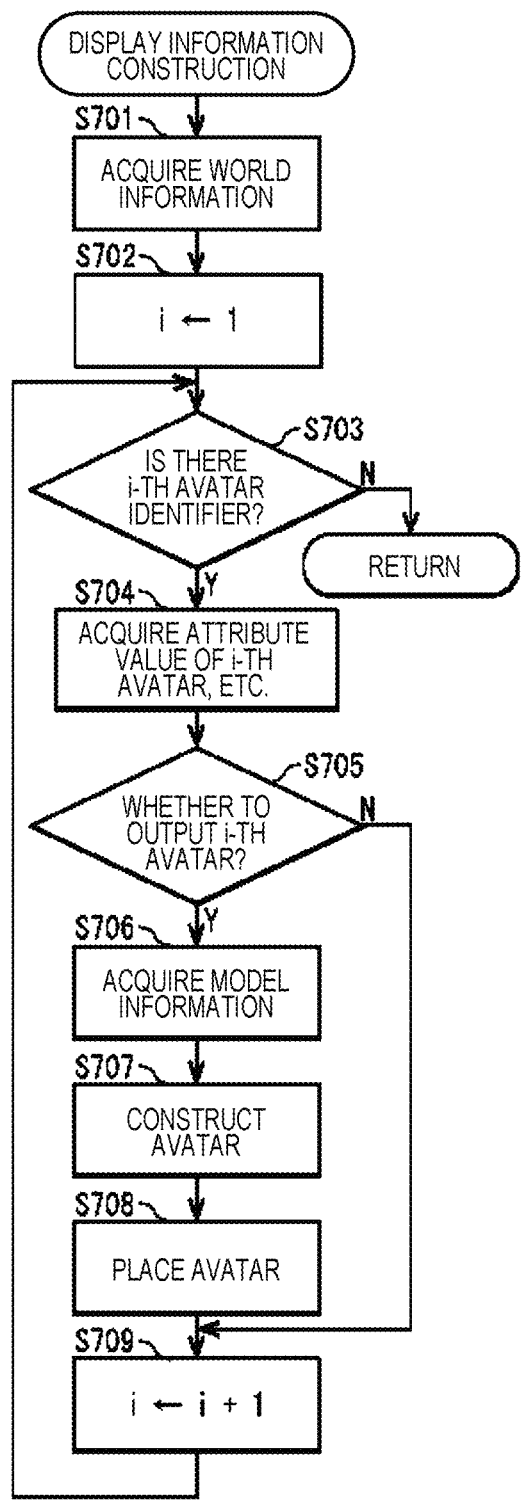
FIG. 7 is a flowchart for describing an example of display information constructing processing according to one or more aspects of the disclosed subject matter.

Next, an example of the display information constructing processing in step S508 will be described with reference to the flowchart of FIG. 7.

(Step S701) The terminal processing unit 23 acquires world information. Note that the world information is information received from the avatar output device 1 or information stored in the terminal storage unit 21.

(Step S702) The terminal processing unit 23 substitutes 1 into the counter i.

(Step S703) The terminal processing unit 23 determines whether or not there is the avatar identifier of the i-th avatar for display information construction. When there is the i-th avatar identifier, the process proceeds to step S704, and when there is no i-th avatar identifier, the process returns to the upper routine.

(Step S704) The terminal processing unit 23 acquires one or more attribute values and the like paired with the i-th avatar identifier from the terminal storage unit 21.

(Step S705) The terminal processing unit 23 determines whether to output the i-th avatar using one or more attribute values and the like acquired in step S704. When the i-th avatar is to be output, the process proceeds to step S706, and when the i-th avatar is not to be output, the process proceeds to step S709. The terminal processing unit 23 determines not to output other avatars that are not within the field of view of the camera or other avatars that are not in the visual field of the host avatar of the user, for example.

(Step S706) The terminal processing unit 23 acquires model information paired with the i-th avatar identifier. Note that the model information is, for example, the first model information or the second model information determined based on the determination result of each avatar.

(Step S707) The terminal processing unit 23 constructs an avatar to be displayed using the model information acquired in step S706.

(Step S708) The terminal processing unit 23 uses the position information paired with the i-th avatar identifier to place the avatar constructed in step S707 in the world constituted by the world information acquired in step S701.

(Step S709) The terminal processing unit 23 increments the counter i by 1. The process returns to step S703.

Figure 8:
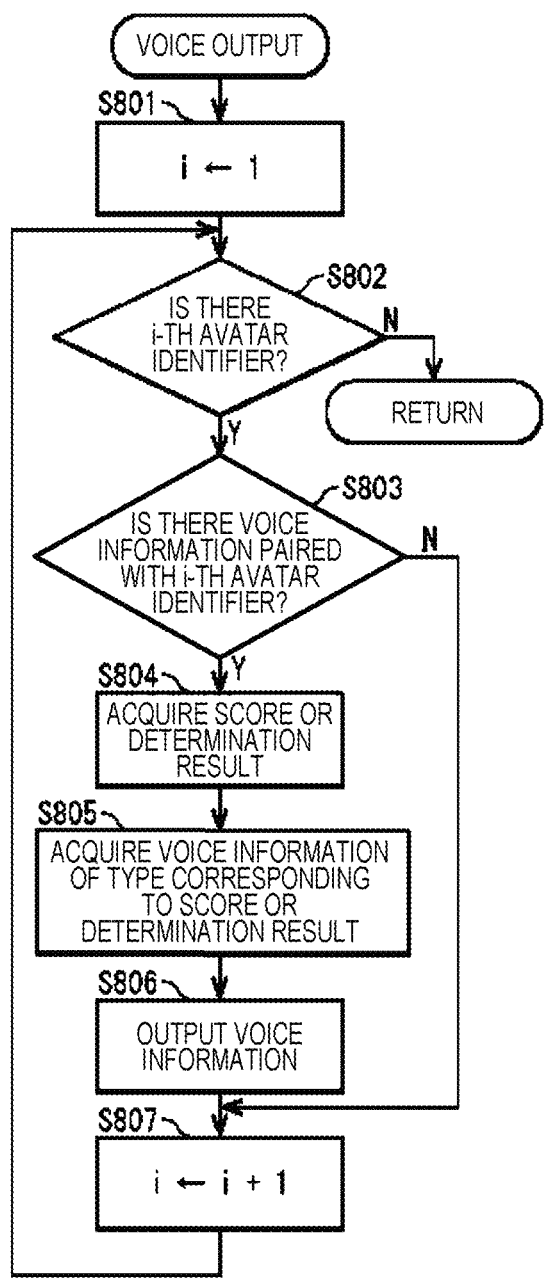
FIG. 8 is a flowchart for describing an example of sound output processing according to one or more aspects of the disclosed subject matter.

Next, an example of the voice output processing in step S511 will be described with reference to the flowchart of FIG. 8.

(Step S801) The terminal processing unit 23 substitutes 1 into the counter i.

(Step S802) The terminal processing unit 23 determines whether or not there is the avatar identifier of the i-th avatar. When there is the i-th avatar identifier, the process proceeds to step S803, and when there is no i-th avatar identifier, the process returns to the upper routine.

(Step S803) The terminal processing unit 23 determines whether or not there is voice information paired with the i-th avatar identifier. When there is the voice information, the process proceeds to step S804, and when the voice information is not present, the process proceeds to step S807. Note that the voice information paired with the i-th avatar identifier is, for example, information received from the avatar output device 1.

(Step S804) The terminal processing unit 23 acquires a score or a determination result paired with the i-th avatar identifier.

(Step S805) The terminal processing unit 23 acquires voice information of a type corresponding to the score or the determination result in step S804.

Here, in a case where two or more types of voice information are stored in pairs with the i-th avatar identifier, for example, the terminal processing unit 23 acquires the voice information of a type corresponding to the score or the determination result among the voice information (for example, the first voice information and the second voice information) paired with the i-th avatar identifier. In a case where one piece of voice information is stored in pairs with the i-th avatar identifier, for example, the terminal processing unit 23 acquires the voice information to be output by changing the attribute value (e.g., volume, frequency) of the one piece of voice information according to the score or the determination result.

(Step S806) The terminal output unit 26 outputs the voice information acquired in step S805.

(Step S807) The terminal processing unit 23 increments the counter i by 1. The process returns to step S802.

Figure 9:
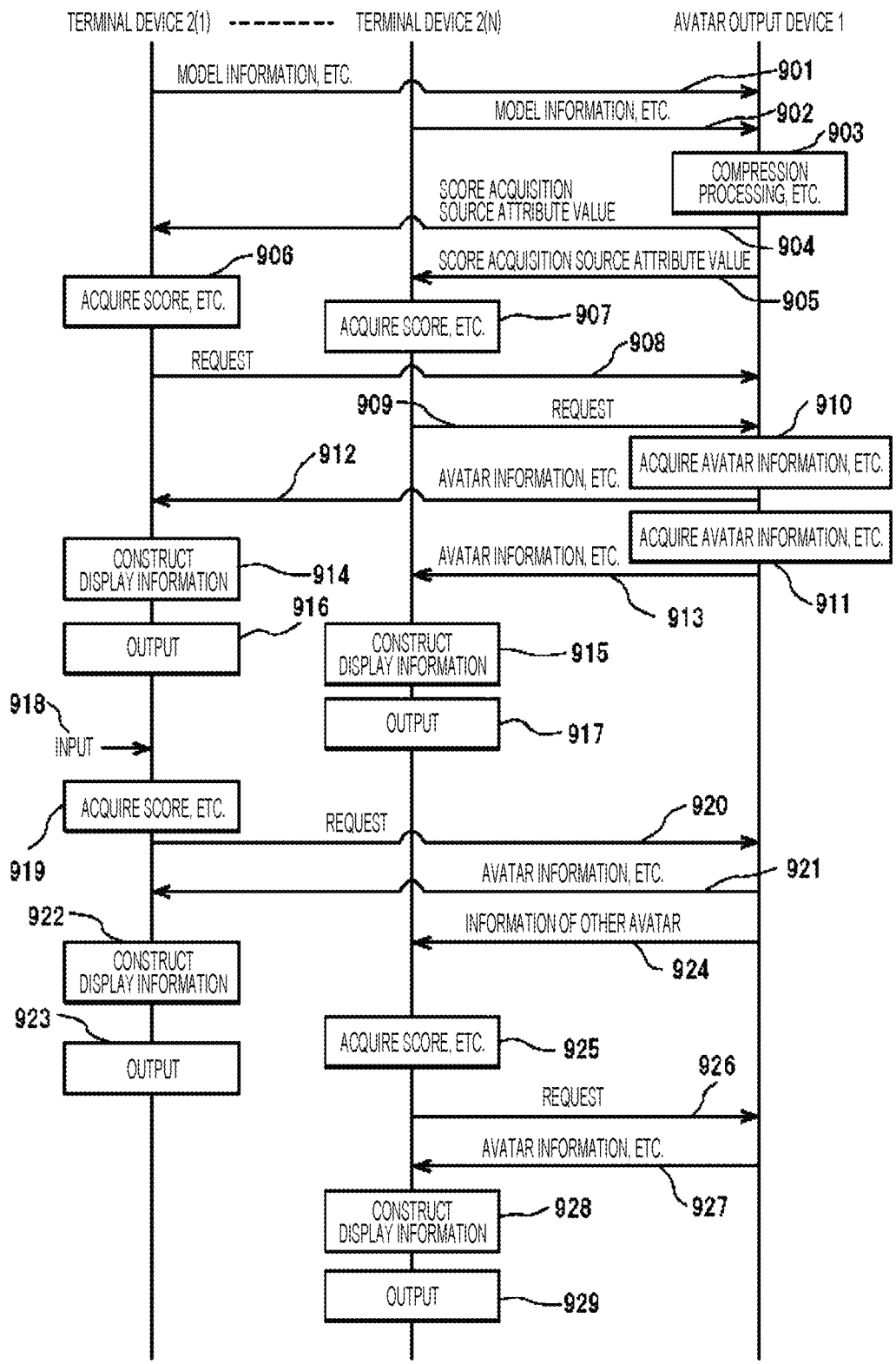
FIG. 9 is a diagram for describing a specific operation example of the information system.

A specific operation example of the information system A according to the present embodiment will now be described with reference to FIG. 9. The information system A includes the avatar output device 1 and two or more terminal devices 2. Here, two or more terminal devices 2 are referred to as terminal devices 2(1) to 2(N).

It is assumed that the terminal acceptance unit 22 of the terminal device 2(1) receives model information and the like from the user. Then, the terminal processing unit 23 constructs model information and the like to be transmitted using the received model information and the like. The terminal transmission unit 24 transmits the model information to the avatar output device 1 (see 901). Here, the model information and the like include the first model information and one or more attribute values. Here, the one or more attribute values include position information, a role attribute value, an origin attribute value, and a terminal attribute value.

Similarly, the terminal device 2(N) also transmits the model information and the like received from the user to the avatar output device 1 (see 902).

Next, the avatar reception unit 121 of the avatar output device 1 receives the model information and the like from the terminal device 2(1), the terminal device 2(N), and the like (see 901 and 902). Then, the avatar accumulation unit 132 generates a unique avatar identifier for each piece of model information and the like. Next, it is assumed that the avatar accumulation unit 132 accumulates the received model information and the like in an avatar management table having the structure of FIG. 10 of the avatar storage unit 112 in association with the avatar identifier.

The avatar management table includes "ID", "avatar identifier", "first model information", "second model information", and "attribute value". The "attribute value" has "position information", "role attribute value", "origin attribute value", and "terminal attribute value". Here, the "terminal attribute value" has a "screen size" and an "operating frequency". The "ID" is information for identifying a record. The "first model information" is a file name of the first model information. The "second model information" is a file name of the second model information. Note that each file is also stored in the avatar storage unit 112. The "position information" is information for specifying the position of the avatar in the three-dimensional space. In addition, the "role attribute value" here can take any one of "organizer", "MC", and "audience". The "origin attribute value" may be either "UGC" or "default". The "UGC" indicates an avatar created by the user. The "default" indicates a default avatar. The default avatar is, for example, an avatar prepared in advance by the administrator of the avatar output device 1. Note that, at the present stage, there is no information in the "second model information" in the table.

Next, the model compression unit 131 of the avatar output device 1 detects that a predetermined condition is satisfied (for example, a predetermined time has come), and performs the above-described compression processing on the first model information of the terminal device 2(1), the terminal device 2(N), and the like to acquire the second model information (see 903). Next, the model compression unit 131 accumulates two or more pieces of the second model information in the avatar storage unit 112, and accumulates file names of the two or more pieces of the second model information in the avatar management table in pairs with the avatar identifier. Through the above processing, the avatar management table of FIG. 10 is generated. Note that, in the avatar management table in FIG. 10, "$D_1$.json" is the first model information of the default avatar, and "$D_2$.json" is the second model information of the default avatar.

Next, the processing unit 13 acquires the score acquisition source attribute values of all the avatars from the avatar management table in FIG. 10 or the storage unit 11 in association with the avatar identifiers. Here, the score acquisition source attribute value is assumed to include the five attribute values in FIG. 10 and the camera attribute value (camera position information, camera orientation information, and angle of view information). Note that the camera attribute value is assumed to be stored in the storage unit 11.

Next, the position information transmitting unit 141 transmits the score acquisition source attribute values of all the avatars to all the terminal devices 2 including the terminal device 2(1) and the terminal device 2(N) in association with the avatar identifiers (see 904 and 905).

Next, the terminal reception unit 25 of the terminal device 2(1) receives the score acquisition source attribute values of all the avatars (see 904). The terminal reception unit 25 of the terminal device 2(N) or the like also receives the score acquisition source attribute values of all the avatars (see 904).

Next, the terminal processing units 23 of the terminal device 2(1) and the like acquire the imaging range attribute value of each of the other avatars and the distance from the camera for each of the other avatars, using the position information of each of the other avatars, the camera position information, the camera orientation information, and the angle of view information included in the received score acquisition source attribute values. In addition, all the terminal processing units 23 of the terminal device 2(1) and the like acquire, for each of the other avatars, the distance between the host avatar and the other avatar using the position information of the host avatar of each terminal device and the position information of each of the other avatars.

Next, the terminal processing unit 23 of the terminal device 2(1) or the like acquires the score for each of the other avatars using the imaging range attribute value corresponding to the other avatar, the distance from the camera, the distance between the host avatar and the other avatar, the role attribute value, the origin attribute value, and the like. Next, the terminal processing unit 23 of the terminal device 2(1) or the like acquires the determination result "first" or "second" for each of the other avatars. Note that, here, it is assumed that the terminal processing unit 23 acquires the determination result "first" for the other avatar whose score is equal to or greater than the threshold value, and acquires the determination result "second" for the other avatar whose score is less than the threshold value (see 906 and 907).

Figure 11:
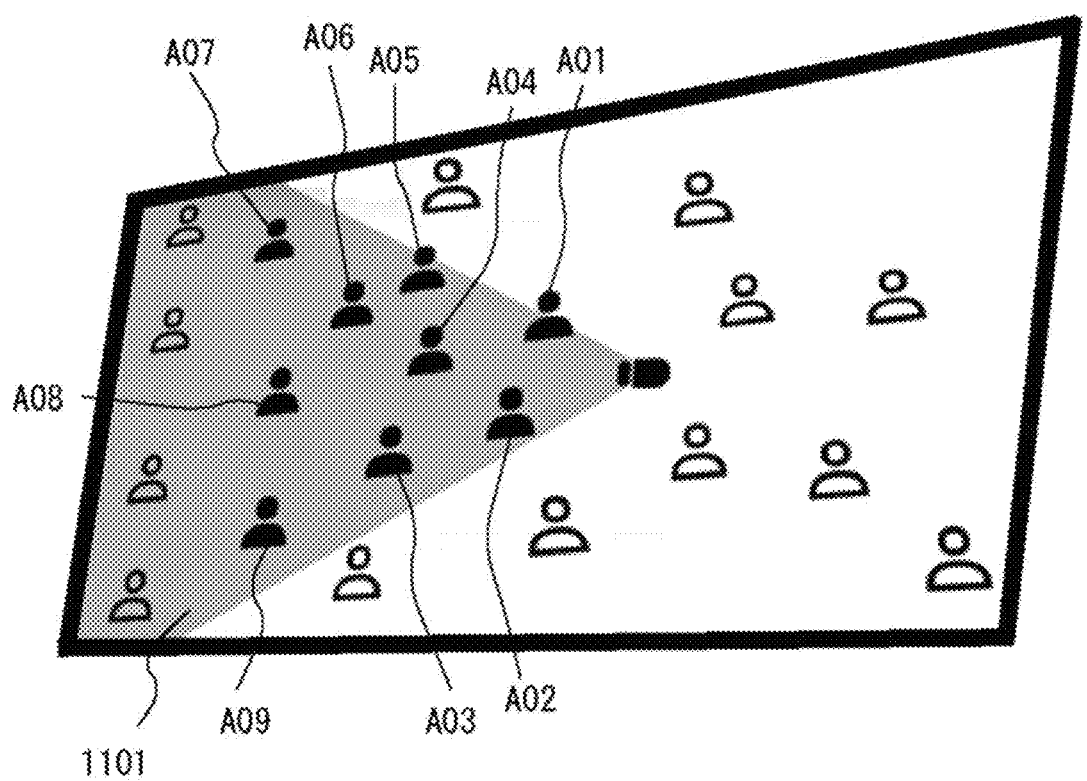
FIG. 11 is a diagram illustrating an image of a determination result according to one or more aspects of the disclosed subject matter.

The concept of the determination result here is represented in, for example, FIG. 11. In FIG. 11, in a case where a region 1101 indicated in gray is the imaging range of the camera, the nine avatars that are included in the imaging range of the camera and are close to the camera have the determination result "first", and the other avatars have the determination result "second". In FIG. 11, the avatar having the determination result "first" is filled in black, and the avatar having the determination result "second" is not filled in black. In addition, the determination results are different among the terminal devices 2 including the terminal devices 2(1) to 2(N). Note that the nine avatars corresponding to the determination result "first" are A01, A02, A03, A04, A05, A06, A07, A08, and A09 in FIG. 11.

Similarly, in FIG. 11, when it is considered that the region 1101 indicated in gray is the visual field viewed from the specific terminal device (N), it is possible to determine in consideration of the visual field of the host avatar.

Next, all the terminal processing units 23 of the terminal devices 2(1) and the like create requests each including the same number of sets of the avatar identifier of the other avatar and the determination result as the number of the other avatars. Next, the terminal transmission unit 24 of each of the terminal devices 2(1) to 2(N) transmits the request to the avatar output device 1 (see 908 and 909).

Next, the reception unit 12 of the avatar output device 1 receives the requests from two or more terminal devices 2 (see 908 and 909).

Next, the determination unit 133 of the avatar output device 1 acquires the determination result corresponding to each avatar identifier included in the request from each terminal device 2. Next, the avatar acquisition unit 134 acquires, for each avatar identifier, a file name of the attribute value "first model information" or the attribute value "second model information" from the avatar management table (FIG. 10) according to the determination result, and acquires the first model information or the second model information identified by the file name from the avatar storage unit 112 in association with the avatar identifier. Note that the first model information is acquired for the avatar identifier corresponding to the determination result "first", and the second model information is acquired for the avatar identifier corresponding to the determination result "second".

Next, the avatar acquisition unit 134 detects that a world information transmission flag indicating whether or not the world information has been transmitted is OFF (not transmitted), and determines to transmit the world information. Then, the avatar acquisition unit 134 acquires the world information from the world storage unit 111. The determination unit 133 and the avatar acquisition unit 134 perform the above processing for each terminal device 2, and acquire the first model information or the second model information associated with the avatar identifier and the world information (see 910 and 911).

Next, the avatar output unit 142 transmits the information acquired by the avatar acquisition unit 134 to each of the two or more terminal devices 2 that have transmitted the requests (see 912 and 913). Note that the processing unit 13 sets the world information transmission flag to ON (transmitted) upon transmission of the world information.

Next, the terminal reception units 25 of the two or more terminal devices 2 receive information in response to the transmission of the requests (see 912 and 913). The information here includes the world information and two or more sets of the avatar identifier and the model information.

Figure 12:
FIG. 12 is a diagram illustrating an output example according to one or more aspects of the disclosed subject matter.

Next, the terminal processing units 23 of the two or more terminal devices 2 perform the above-described display information constructing processing using the received information (see 914 and 915). The terminal output unit 26 outputs the information constructed by the display information constructing processing (see 916 and 917). The output information has many avatars in a virtual three-dimensional space. Note that such an output example is illustrated in FIG. 12. In FIG. 12, avatars corresponding to the respective users of two or more terminal devices 2 are displayed together with the world. In addition, the first model information is used or the second model information is used for the same avatar depending on terminal devices 2.

Furthermore, a video acquired by the camera in the world is displayed on a virtual screen 1201 in FIG. 12. In that case, for example, the avatar output device 1 constructs a video acquired by the camera in the world and transmits the video to each terminal device 2. Then, the terminal reception unit 25 of each terminal device 2 receives the video acquired by the camera. Then, the terminal processing unit 23 pastes the received video on a virtual screen in the world, and then the terminal output unit 26 outputs the world including the screen to which the video is pasted together with the avatars corresponding to the respective users.

It is assumed that time has elapsed and the user has made an input to the terminal device 2(1) to change the position information of the host avatar (see 918).

Next, the terminal processing unit 23 of the terminal device 2(1) calculates the score of each of the one or more other avatars again according to the change in the position information of the host avatar. Note that the terminal processing unit 23 is assumed to have already received information other than the position information of the host avatar (information of the other avatars, camera attribute value, etc.), and to calculate the score of each of the one or more other avatars using accumulated information.

Next, the terminal processing unit 23 of the terminal device 2(1) acquires a determination result according to the score of each of the one or more other avatars (see 919).

Next, the terminal processing unit 23 creates a request including one or more sets of the avatar identifier of the other avatar whose determination result has changed from the previous determination result and the determination result, and the changed position information of the host avatar.

Next, the terminal transmission unit 24 of the terminal device 2(1) transmits the created request to the avatar output device 1 (see 920).

Next, the reception unit 12 of the avatar output device 1 receives the request from the terminal device 2(1) (see 920).

Next, the determination unit 133 of the avatar output device 1 acquires the determination result corresponding to each of one or more avatar identifiers included in the request from the terminal device 2(1). Next, the avatar acquisition unit 134 acquires, for each avatar identifier, a file name of the attribute value "first model information" or the attribute value "second model information" from the avatar management table (FIG. 10) according to the determination result, and acquires the first model information or the second model information identified by the file name from the avatar storage unit 112 in association with the avatar identifier.

Next, the avatar acquisition unit 134 determines not to transmit the world information, because the world information has already been transmitted to the terminal device 2(1).

Next, the avatar output unit 142 transmits the information acquired by the avatar acquisition unit 134 to the terminal device 2(1) that has transmitted the request (see 921).

Furthermore, the terminal processing unit 23 of the terminal device 2(1) constructs the display information to be changed in accordance with the update of the position information of the host avatar by also using the received model information of the other avatar (see 922). Next, the terminal output unit 26 of the terminal device 2(1) outputs newly constructed display information (see 923). Note that the terminal processing unit 23 also changes the position information (relative position information) of the other avatar in accordance with the update of the position information of the host avatar.

In addition, the avatar output unit 142 transmits the information of the other avatar including the changed position information of the avatar of the terminal device 2(1) and the avatar identifier of the avatar of the terminal device 2(1) to one or more terminal devices 2 including the terminal device 2(N) (see 924).

Next, the terminal reception unit 25 of the terminal device 2(N) or the like receives the information of the other avatar of the terminal device 2(1).

Next, the terminal processing unit 23 of the terminal device 2(N) or the like acquires a new score for the avatar of the terminal device 2(1) due to a change in the position information of the avatar of the terminal device 2(1). Next, the terminal processing unit 23 of the terminal device 2(N) or the like acquires a determination result for the avatar of the terminal device 2(1) (see 925).

Then, it is assumed that the determination result of the avatar of the terminal device 2(1) in the terminal device 2(N) is different from the previous determination result.

Next, the terminal transmission unit 24 of the terminal device 2(N) transmits a request including the avatar identifier of the other avatar of the terminal device 2(1) and the new determination result to the avatar output device 1 (see 926). Note that the terminal device (2) in which the determination result of the avatar of the terminal device 2(1) is the same as the previous determination result does not transmit a request to the avatar output device 1.

Next, the reception unit 12 of the avatar output device 1 receives the request from the terminal device 2(N) (see 926).

Next, the determination unit 133 of the avatar output device 1 acquires the determination result corresponding to the avatar identifier included in the request from the terminal device 2(N). Next, according to the determination result of the avatar identifier, the avatar acquisition unit 134 acquires, from the avatar management table (FIG. 10), a file name that is a file name of the attribute value "first model information" or the attribute value "second model information" and is paired with the avatar identifier, and acquires, from the avatar storage unit 112, the first model information or the second model information identified by the file name in association with the avatar identifier.

Next, the avatar output unit 142 transmits the information acquired by the avatar acquisition unit 134 to the terminal device 2(N) that has transmitted the request (see 927).

Next, the terminal reception unit 25 of the terminal device 2(N) receives the information in response to the transmission of the request (see 927).

Next, the terminal processing unit 23 of the terminal device 2(N) performs display information constructing processing using the received information (see 928). The terminal output unit 26 of the terminal device 2(N) outputs the information constructed by the display information constructing processing (see 929). Note that, by the display information constructing processing described above, the position of the avatar of the terminal device 2(1) moves in the terminal device 2(N), and the model information used for displaying the avatar is changed from the second model information to the first model information, for example.

Note that, due to a change in the position information of the avatar of the terminal device 2(1), the terminal device 2 other than the terminal device 2(N) may also transmit a request to the avatar output device 1 and output the changed information, similarly to the terminal device 2(N).

As described above, according to the present disclosure, at least some of the two or more avatars are set to have a smaller data size. Thus, when many avatars are output, it is possible to obtain an avatar suitable for the user while suppressing the processing load.

In addition, according to the present disclosure, the voice information corresponding to the avatar is used, whereby appropriate voices of two or more avatars can be output.

In addition, according to the present disclosure, the model information or the original information of the avatar can be received and used from each of two or more terminal devices. That is, the user can display his or her favorite avatar in the field.

In addition, according to the present disclosure, the scores of the other avatars are acquired by each of two or more terminal devices 2, whereby the load on the avatar output device 1 can be reduced.

In addition, according to the present disclosure, an avatar that is to be set to have a smaller data size can be determined based on an appropriate score acquired using an appropriate dynamic attribute value of the avatar.

In addition, according to the present disclosure, an avatar only partly having a small size can be used.

Furthermore, according to the present disclosure, the processing can be appropriately shared by the two or more terminal devices 2 and the avatar output device 1.

Note that, in the present disclosure, the manner of sharing the processing until the avatar is displayed in the terminal device 2 between the two or more terminal devices 2 and the avatar output device 1 is not particularly limited. In the above specific example, the terminal device 2, for example, has acquired the score of each avatar and made determination. However, the terminal device 2 may acquire the score of each avatar, and the avatar output device 1 may make determination using the score. Alternatively, the avatar output device 1 may acquire the score of each avatar and make determination.

In addition, the processing in the present disclosure may be implemented by software. The software may be downloaded and distributed. Alternatively, the software may be recorded on a recording medium such as a compact disc read-only memory (CD-ROM) and distributed. Note that this also applies to other embodiments in the present specification. Note that the software for implementing the avatar output device 1 according to the present disclosure has the following program. Specifically, this program causes a computer that is accessible to an avatar storage unit that stores, for each of two or more avatars, avatar information having first model information for displaying the avatar to function as: a determination unit that determines at least one first avatar displayed using the first model information and at least one second avatar displayed using second model information with a data size smaller than the data size of the first model information from among the two or more avatars; an avatar acquisition unit that acquires an avatar using the second model information for each of the at least one second avatar determined by the determination unit, and acquires an avatar using the first model information for each of the at least one first avatar; and an avatar output unit that outputs the two or more avatars acquired by the avatar acquisition unit.

Figure 13:
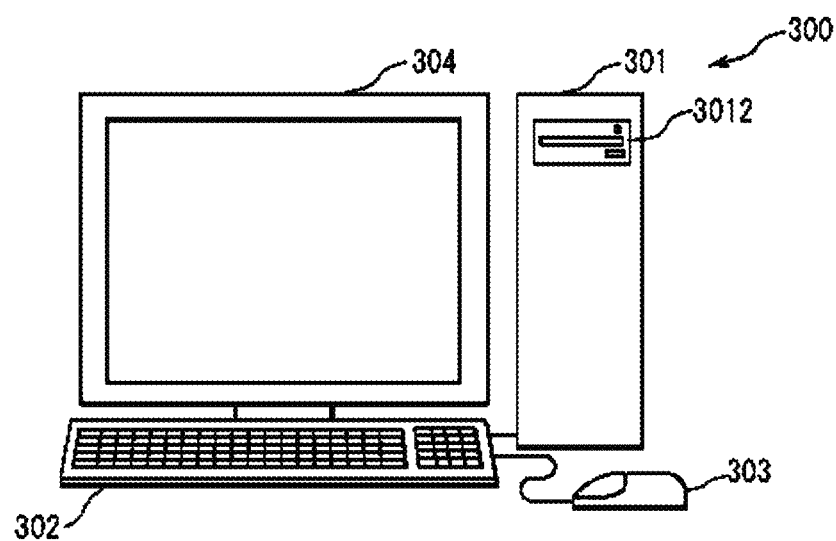
FIG. 13 is a diagram illustrating an appearance of a computer system according to one or more aspects of the disclosed subject matter.

FIG. 13 illustrates an appearance of a computer that executes the program described in the present specification to implement the avatar output device 1 and the like according to the embodiment described above. The above-described embodiment can be implemented by computer hardware and a computer program executed on the computer hardware. FIG. 13 is a schematic diagram of a computer system 300, and FIG. 14 is a block diagram of the system 300.

In FIG. 13, the computer system 300 includes a computer 301 including a CD-ROM drive, a keyboard 302, a mouse 303, and a monitor 304.

In FIG. 14, the computer 301 includes, in addition to the CD-ROM drive 3012, an MPU 3013, a bus 3014 connected to the CD-ROM drive 3012 and the like, a ROM 3015 for storing a program such as a boot-up program, a random access memory (RAM) 3016 connected to the MPU 3013 for temporarily storing an instruction of an application program and providing a temporary storage space, and a hard disk 3017 for storing the application program, a system program, and data. Although not illustrated, the computer 301 may further include a network card that provides connection to a local area network (LAN). Note that each of the two or more terminal devices 2 includes a camera, a speaker, and a microphone.

A program for causing the computer system 300 to execute the functions of the avatar output device 1 and the like according to the above-described embodiment may be stored in the CD-ROM 3101 which is inserted into the CD-ROM drive 3012, and further transferred to the hard disk 3017. Alternatively, the program may be transmitted to the computer 301 via a network and stored in the hard disk 3017. The program is loaded into the RAM 3016 at the time of execution. The program may be directly loaded from the CD-ROM 3101 or the network.

The program may not necessarily include an operating system (OS), a third-party program, or the like that causes the computer 301 to execute the functions of the avatar output device 1 and the like according to the above-described embodiment. The program only needs to include a portion of an instruction that calls an appropriate function (module) in a controlled manner to obtain a desired result. How the computer system 300 works is well known, and a detailed description thereof will be omitted.

Note that, in the above program, the step of transmitting information, the step of receiving information, and the like do not include processing performed by hardware, for example, processing performed by a modem, an interface card, or the like in the transmission step (processing performed only by hardware).

The number of computers that execute the program may be one or more. That is, centralized processing or distributed processing may be performed.

Further, it is obvious that two or more communication means in one device may be physically achieved by one medium.

In addition, in the above embodiment, each processing may be achieved by centralized processing using a single device, or may be achieved by distributed processing using a plurality of devices.

It is obvious that the present disclosure is not limited to the above description, and various modifications are possible and are also included in the scope of the present disclosure.

As described above, the avatar output device according to the present disclosure has an effect of being able to obtain an avatar suitable for a user while suppressing a processing load, when outputting a large number of avatars, and the present disclosure is useful as an avatar output device or the like.

What is claimed is:

1. An avatar output device comprising:
   a memory configured to store, for each of two or more avatars, avatar information including first model information for displaying the avatar; and processing circuitry configured to receive, from each of two or more terminal devices, a score of at least one other avatar acquired by each of the two or more terminal devices, the score of the at least one other avatar corresponding to a terminal device other than the terminal device from which the score was received;

determine, for each of the two or more terminal devices, at least one first avatar to be displayed using the first model information and at least one second avatar to be displayed using second model information with a data size smaller than a data size of the first model information from among the two or more avatars using the score and based on a change of a position of the avatar;

acquire an avatar using the second model information for each of the at least one second avatar, and acquire an avatar using the first model information for each of the at least one first avatar; and output the two or more acquired avatars.

2. The avatar output device according to claim 1, wherein the processing circuitry is further configured to receive position information that specifies a position of the avatar corresponding to each of the two or more terminal devices from each of the two or more terminal devices, and transmit, in association with the avatar identifier for identifying the avatar, position information of at least one other avatar from among position information of the two or more avatars corresponding to the two or more terminal devices except for at least the position information of a host avatar corresponding to the terminal device that is a transmission source, to each of the two or more terminal devices.

3. The avatar output device according to claim 1, wherein the processing circuitry is further configured to determine the at least one second avatar based on the score acquired using at least one dynamic attribute value that is an attribute value corresponding to each of the two or more avatars and that is dynamically changeable.

4. The avatar output device according to claim 3, wherein the at least one dynamic attribute value includes any one of an attribute value relating to a visual field of a user corresponding to the avatar, an attribute value relating to a distance from the user, and an attribute value relating to an orientation of the user.

5. The avatar output device according to claim 1, wherein the second model information is model information in which information of only a part of the avatar has a reduced data size.

6. The avatar output device according to claim 1, wherein the avatar information of each of the two or more avatars in the memory includes the first model information and the second model information, and the processing circuitry is further configured to read the second model information and construct the avatar using the second model information for the at least one second avatar; and reads the first model information and constructs the avatar using the first model information for the at least one first avatar.

7. The avatar output device according to claim 1, wherein the avatar information of each of the two or more avatars in the memory includes at least one static attribute value that does not dynamically change, and the processing circuitry is further configured to determine the at least one second avatar using information based on the at least one static attribute value corresponding to each of the two or more avatars.

8. The avatar output device according to claim 7, wherein the at least one static attribute value includes any one of a role attribute value related to a role of the avatar, an origin attribute value indicating whether or not the avatar is created by a user, and an attribute value of the terminal device corresponding to the avatar.

9. The avatar output device according to claim 1, wherein the second model information is model information having M, where M is a natural number of 1 or more, mesh information acquired using N, where N is a natural number of 2 or more, mesh information included in the first model information, M being less than N.

10. An avatar output method implemented by a memory configured to store at least one terminal attribute value including position information of an avatar corresponding to a terminal device, the method comprising:

transmitting the position information of the avatar corresponding to the terminal device to an avatar output device;

receiving, from the avatar output device, position information of another avatar corresponding to at least one other terminal device; and acquiring a score of the at least one other avatar using the position information of the at least one other avatar and the position information of the avatar corresponding to the terminal device, wherein transmitting the position information of the avatar includes transmitting, to the avatar output device, the score of the at least one other avatar in association with a terminal identifier of the terminal device, the score of the at least one other avatar corresponding to a terminal device other than the terminal device from which the score was received, wherein receiving the position information includes receiving, in response to the transmission of the score, different pieces of model information of the other avatar corresponding to the score or the determination result from the avatar output device, and displaying the at least one other avatar using the model information.

11. An avatar output device comprising:

a memory configured to store, for each of two or more avatars, avatar information including first model information for displaying the avatar; and processing circuitry configured to receive, from each of two or more terminal devices, a determination result based on a score of at least one other avatar acquired by each of the two or more terminal devices in association with an avatar identifier, the determination result of the at least one other avatar corresponding to a terminal device other than the terminal device from which the score was received;

determine, for each of the two or more terminal devices, at least one first avatar to be displayed using the first model information and at least one second avatar to be displayed using second model information with a data size smaller than a data size of the first model information from among the two or more avatars, using the determination result;

acquire an avatar using the second model information for each of the at least one second avatar, and acquire an avatar using the first model information for each of the at least one first avatar; and output the two or more acquired avatars.

12. The avatar output device according to claim 1, wherein the processing circuitry is further configured to receive, from each of two or more terminal devices, a determination result based on the score in association with an avatar identifier.

13. The avatar output device according to claim 1, wherein in response to an avatar of a first terminal device changing position, the processing circuitry is further configured to receive a request from the first terminal device including (1) one or more sets of an avatar identifier of any other avatar whose determination result has changed from a previous determination result and (2) the changed position information, acquire a determination result corresponding to each of one or more avatar identifiers included in the request from the terminal device having the first model information or the second model information, transmit the determination result to the first terminal device, wherein the determination result is used by the first terminal device to construct display information to be changed in accordance with the changed position of the avatar of the first terminal device.

* * * * *